(12) United States Patent
Horikawa et al.

(10) Patent No.: US 11,336,866 B2
(45) Date of Patent: May 17, 2022

(54) AIRCRAFT INSPECTION SUPPORT DEVICE AND AIRCRAFT INSPECTION SUPPORT METHOD

(71) Applicant: Shimadzu Corporation, Kyoto (JP)

(72) Inventors: Hiroshi Horikawa, Kyoto (JP); Hiroshi Yagi, Kyoto (JP); Takashi Tanaka, Kyoto (JP); Koji Morita, Kyoto (JP); Hirotaka Sato, Kyoto (JP); Masuto Kitamura, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/285,820

(22) PCT Filed: Oct. 17, 2019

(86) PCT No.: PCT/JP2019/040948
§ 371 (c)(1),
(2) Date: Apr. 15, 2021

(87) PCT Pub. No.: WO2020/080480
PCT Pub. Date: Apr. 23, 2020

(65) Prior Publication Data
US 2021/0385416 A1 Dec. 9, 2021

Related U.S. Application Data

(63) Continuation-in-part of application No. PCT/JP2018/038680, filed on Oct. 17, 2018.

(51) Int. Cl.
*H04N 7/18* (2006.01)
*G01M 17/00* (2006.01)

(52) U.S. Cl.
CPC ............ *H04N 7/181* (2013.01); *G01M 17/00* (2013.01)

(58) Field of Classification Search
CPC ..... H04N 7/181; G01M 17/00; G01N 29/043; G01N 29/4472; G01N 2291/2694; B64F 5/60
(Continued)

(56) References Cited

U.S. PATENT DOCUMENTS

2017/0248948 A1 8/2017 Otani et al.
2019/0072381 A1* 3/2019 Anderson .......... G01N 21/9515
(Continued)

FOREIGN PATENT DOCUMENTS

JP H07-078563 A 3/1995
JP H07-198430 A 8/1995
(Continued)

OTHER PUBLICATIONS

Written Opinion by the International Search Authority for PCT application No. PCT/JP2019/040948 dated Dec. 12, 2019, submitted with a machine translation.

*Primary Examiner* — Thai Q Tran
*Assistant Examiner* — Stephen R Smith
(74) *Attorney, Agent, or Firm* — Muir Patent Law, PLLC

(57) ABSTRACT

This aircraft inspection support device includes a first imaging unit configured to capture a measurement information image displayed on a measurement instrument-side display unit of a specific measurement instrument associated with a model of an aircraft or an inspection target of an aircraft component, the measurement instrument-side display unit being configured to display measurement information on the inspection target, and an operator-side display unit configured to display the measurement information image so as to be visible to an inspection operator who is performing an inspection operation near the inspection target.

30 Claims, 12 Drawing Sheets

(58) Field of Classification Search
USPC .......................................................... 348/125
See application file for complete search history.

(56) References Cited

U.S. PATENT DOCUMENTS

| | | | |
|---|---|---|---|
| 2019/0347860 A1* | 11/2019 | Steiner | G06T 19/006 |
| 2019/0392654 A1* | 12/2019 | Sato | G07C 1/10 |
| 2020/0234425 A1* | 7/2020 | Furuichi | G06K 9/6256 |
| 2021/0174086 A1* | 6/2021 | Cunningham | G01D 3/08 |

FOREIGN PATENT DOCUMENTS

| | | |
|---|---|---|
| JP | H08-061994 A | 3/1996 |
| JP | H10-249474 A | 9/1998 |
| JP | 2001-012976 A | 1/2001 |
| JP | 2001-349789 A | 12/2001 |
| JP | 2011-081715 A | 4/2011 |
| JP | 2013-152198 A | 8/2013 |
| JP | 2013-167480 A | 8/2013 |
| JP | 5574734 B2 | 7/2014 |
| JP | 5701262 B2 | 2/2015 |
| JP | 2017-111078 A | 6/2017 |
| JP | 2017-151008 A | 8/2017 |

* cited by examiner

FIG. 17
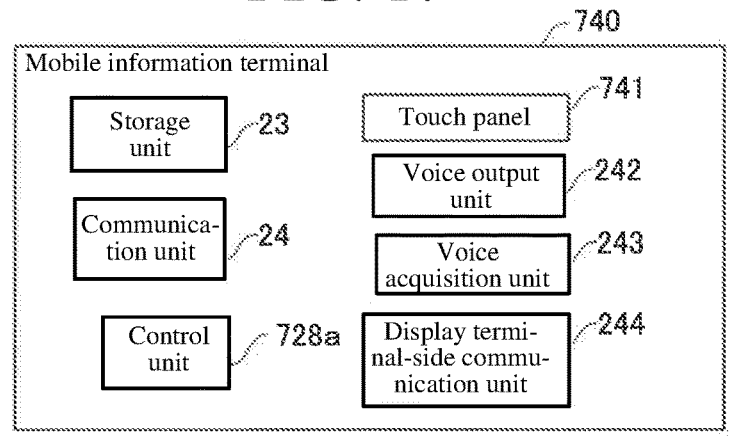
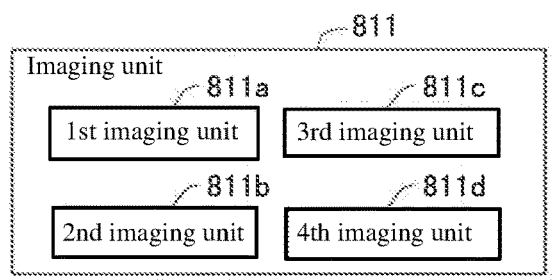
FIG. 18
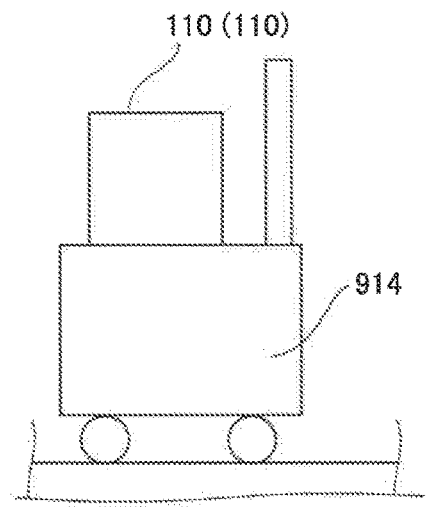
FIG. 19
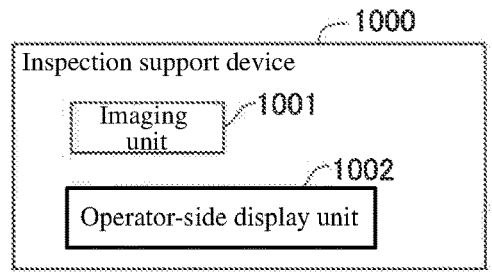
FIG. 20

FIG. 25
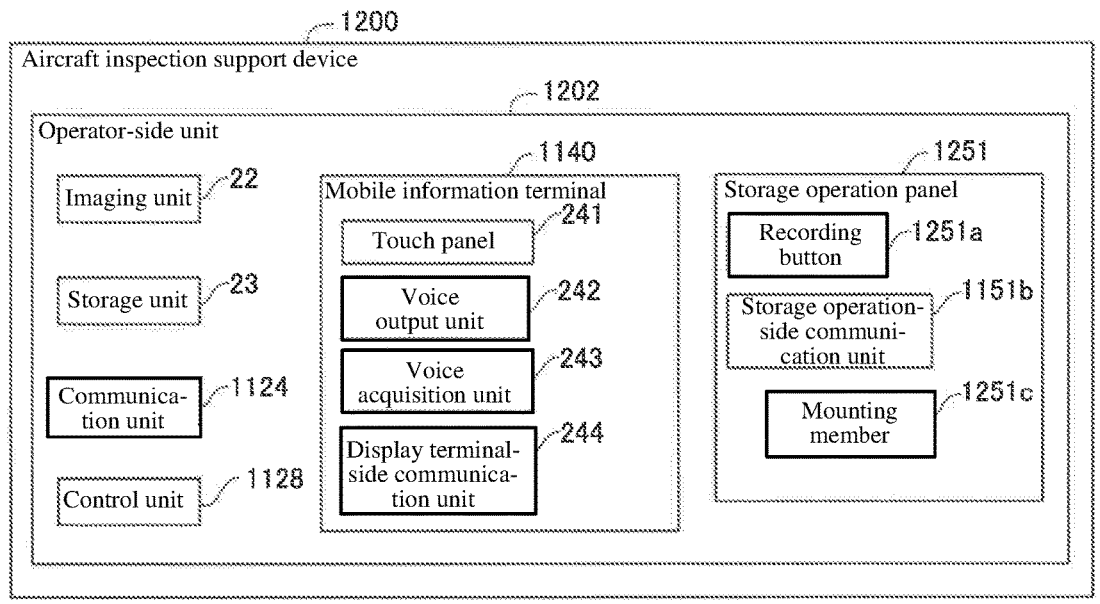
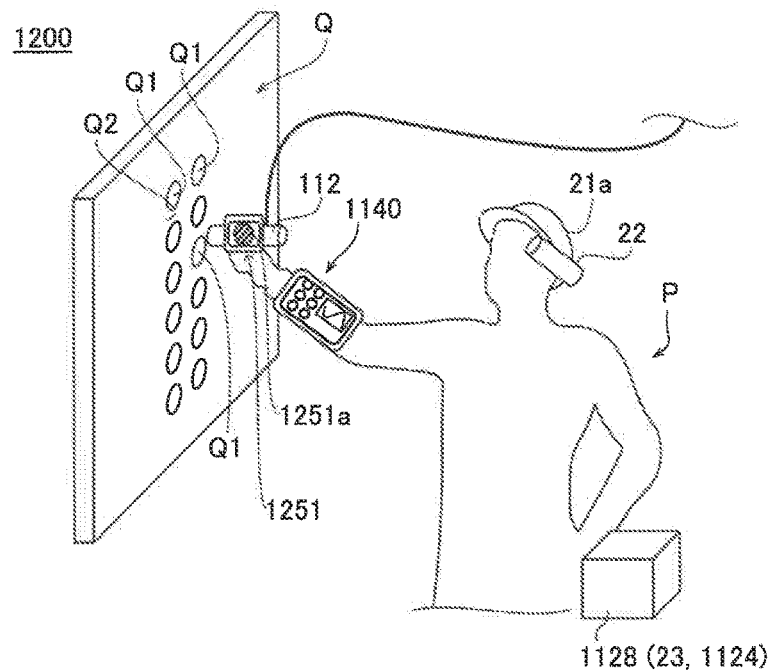
FIG. 26
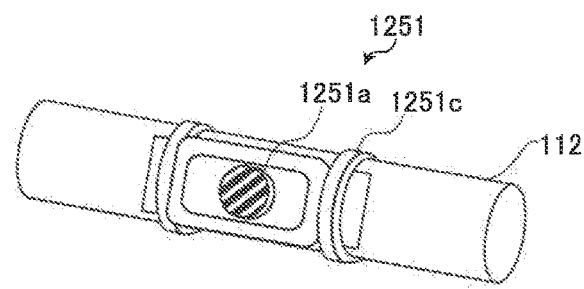
FIG. 27

AIRCRAFT INSPECTION SUPPORT DEVICE AND AIRCRAFT INSPECTION SUPPORT METHOD

TECHNICAL FIELD

The present invention relates to an aircraft inspection support device and an aircraft inspection support method.

BACKGROUND OF ART

Conventionally, an aircraft inspection device and an aircraft inspection method for inspecting an inspection target are known. Such an inspection apparatus and an inspection method are disclosed, for example, in Japanese Unexamined Patent Application Publication No. H10-249474.

Japanese Unexamined Patent Application Publication No. H10-249474 discloses a method of inspecting a junction which is a portion in which rivets join a plurality of plate members. In this inspection method, a first probe is brought into close contact with a surface of a plate material and a second probe is brought into close contact with a rivet by an inspection operator. A pulse transmitted from the first probe is received by the second probe to measure the transmitted pulse. The waveform of the transmitted pulse is displayed on a display unit of the probe arranged so as to be spaced apart from the rivet and the inspection operator. Then, the waveform of the transmitted pulse displayed on the display unit is confirmed by the inspection operator, and the inspection whether or not the caulking portion (rivet) is defective is performed. Although not explicitly described in the above-described Japanese Unexamined Patent Application Publication No. H10-249474, the operation of confirming the waveform displayed on the display unit is performed by an inspection operator other than the inspection operator operating the first probe and the second probe.

The conventional inspection method as described in Japanese Unexamined Patent Application Publication No. H10-249474 is used as an inspection method of an aircraft fuselage in which a plurality of plate members is joined by rivets. Here, there are several tens of thousands of rivets for joining the plate members of the fuselage, which are parts of an aircraft, per aircraft. The inspection of aircraft parts is performed in accordance with a maintenance manual prepared by an aircraft manufacturer before the start of mass production at the time of developing the aircraft and the start of maintenance and maintenance regulations of an aircraft maintenance company approved by an aviation bureau of each country. In such an inspection of aircraft components, not only the inspection method but also the measurement instrument used for the inspection are specified. That is, in the inspection of aircraft components, it is required to use a specific measurement instrument associated with each inspection target, such as, e.g., a model, a part, and a maintenance product of an aircraft.

In the inspection of an aircraft fuselage using such a specific measurement instrument, the inspection operator is generally required to perform the inspection on a relatively narrow scaffold. Further, a specific measurement instrument corresponding to an old-developed aircraft model is a large-scale product in many cases, and a stationary type is generally used. For this reason, such a specific measurement instrument is arranged at a position spaced apart from the inspection operator working near the inspection target. Therefore, it is difficult for the inspection operator holding the measurement probe near the inspection target to directly recognize the measurement information image on the measurement instrument-side display unit of the measurement instrument. Under the circumstance, conventionally, an inspection of an aircraft fuselage using a specific measurement instrument is performed by two or more operators, i.e., an inspection operator holding a measurement probe and an inspection operator performing a pass/fail determination of an inspection target.

PRIOR ART DOCUMENT

Patent Document

Patent Document 1: Japanese Unexamined Patent Application Publication No. H10-249474

SUMMARY OF THE INVENTION

Problems to be Solved by the Invention

According to a conventional aircraft inspection method, as described above, since it is required to use a specific measurement instrument associated with an aircraft model or an inspection target, two (a plurality of) inspection operators are required. Therefore, for example, when the measurement information changes depending on the arrangement state of the measurement probe, the inspection operator holding the measurement probe and the inspection operator confirming the measurement information image need to perform the inspection while confirming each other's operation contents by talking to each other. As a result, there is a problem that the inspection operation becomes complicated.

The present invention has been made to solve the above-described problems. It is an object of the present invention to provide an aircraft inspection support device and an aircraft inspection support method capable of simplifying an inspection operation by reducing the number of required inspection operators or loads even when a specific measurement instrument associated with an aircraft model or an inspection target is used.

Means for Solving the Problem

In order to attain the above-described object, an aircraft inspection support device according to the first aspect of the present invention includes: a first imaging unit configured to capture a measurement information image displayed on a measurement instrument-side display unit of a specific measurement instrument associated with a model of an aircraft or an inspection target of an aircraft component, the measurement instrument-side display unit being configured to display measurement information on the inspection target; and an operator-side display unit configured to display the measurement information image so as to be visible to an inspection operator during performing an inspection operation near the inspection target. Note that in this specification, the term "near an inspection target" is used to mean a range of a position where the inspection operator can contact the inspection target (e.g., bring the measurement probe into contact with the inspection target).

In the aircraft inspection support device according to the first aspect of the present invention, since the above-described operator-side display unit is provided, even in a case where the inspection operator is positioned near the inspection target and is positioned away from the specific measurement instrument (measurement instrument-side display unit) and therefore the inspection operator cannot directly visually recognize the measurement instrument-side display unit, the inspection operator can perform the inspection operation near the inspection target while visually recognizing the measurement information image by the operator-side display unit. With this, no inspection operator is required to directly visually recognize the measurement instrument-side display unit, in addition to the inspection operator performing the inspection near the inspection target. Therefore, the number of required inspection operators can be reduced even in the case of using a specific measurement instrument associated with the aircraft model or the inspection target (e.g., the portion of the aircraft or the maintenance part, etc.). As a result, the inspection work can be simplified, and the burden can be reduced because checking the inspection content between inspection operators is not required.

In the aircraft inspection support device according to the first aspect of the present invention, preferably, the operator-side display unit is configured to be carried by or mounted on the inspection operator. With this configuration, since the operator-side display unit moves as the inspection operator moves, the inspection operator does not need to move the operator-side display unit. Therefore the work load on the inspection operator's inspection work can be reduced.

In the aircraft inspection support device according to the first aspect of the present invention, preferably, the aircraft inspection support device further includes: a storage unit configured to store the measurement information image; and a control unit configured to perform control for acquiring an inspection pass/fail determination result related to the inspection target based on a measurement result of the measurement instrument-side display unit by the inspection operator, associating the measurement information image and the inspection pass/fail determination result, and storing the measurement information image and the inspection pass/fail determination result in the storage unit. Since an aircraft is generally used for 30 years or longer, in the case of using a specific measurement instrument which has been used since the introduction of the aircraft, the instrument has no function of storing a measurement information image or performing information communication with a storage device. Therefore, the inspection operator needs to write down the inspection results (pass/fail determinations) on a sheet of paper by handwriting or the like. Further, in this case, since it is not easy to manually record detailed information (waveforms or numerical values) of the measurement information, the detailed information is generally not recorded. On the other hand, in the present invention, as described above, the aircraft inspection support device is further provided with the storage unit and the control unit for performing control for storing the measurement information image and the inspection pass/fail determination result in the storage unit. Therefore, even in a case where a specific measurement instrument has no function of storing the measurement information and no function of communicating information, the information (associated information) in which the measurement information image and the inspection pass/fail determination result are associated can be stored in the storage unit. When verifying or analyzing the inspection result after the inspection, the information (associated information) in which the measurement information image and the inspection pass/fail determination result are associated with each other can be read out from the storage unit. That is, after the inspection, the inspection result can be verified and analyzed by using the information in which the measurement information image and the inspection pass/fail determination result are associated with each other. As a result, the inspection result can be verified and analyzed more effectively as compared with the case in which the measurement information image and the inspection pass/fail determination result are not associated with each other.

In this case, preferably, the control unit is configured to perform control for associating the measurement information image and the inspection pass/fail determination result at a time of acquiring the inspection pass/fail determination result and storing the measurement information image and the inspection pass/fail determination result in the storage unit. With this configuration, since the information in which the measurement information image and the inspection pass/fail determination result are associated is stored in the storage unit at the time when the inspection pass/fail determination result is acquired (in real time), the information can be stored more efficiently as compared with the case in which the operation of associating the measurement information image and the inspection pass/fail determination result is performed after the inspection.

In the aircraft inspection support device in which the measurement information image and the inspection pass/fail determination result are associated at the time when the inspection pass/fail determination result is acquired, preferably, the aircraft inspection support device further includes: a determination operation unit configured to receive an input operation by the inspection operator as the inspection pass/fail determination result, wherein the control unit is configured to perform control for associating the measurement information image and the inspection pass/fail determination result at a time of receiving the input operation to the determination operation unit and storing the measurement information image and the inspection pass/fail determination result in the storage unit. With this configuration, since the measurement information image and the inspection pass/fail determination result can be associated with each other at the time when the inspection operator performs the input operation, the measurement information image and the inspection pass/fail determination result can be easily associated with each other at the time when the inspection operator intends to associate them with each other.

In this case, preferably, the determination operation unit is configured to receive, in addition to the inspection pass/fail determination result, the input operation by the inspection operator as information on an aircraft inspection, and the control unit is configured to perform control for storing the information on the aircraft inspection acquired from the determination operation unit in the storage unit. With this configuration, when the inspection result is verified and analyzed after the inspection, in addition to the measurement information image and the inspection pass/fail determination result, the information (for example, information on the target model number, the inspection date and time, the inspection operator, the inspection portion, and the like) on the aircraft inspection stored in the storage unit can be used. As a result, the verification and the analysis after the inspection can be performed in more detail.

In the aircraft inspection support device provided with the above-described storage unit and the control unit, preferably, the aircraft inspection support device further includes: a second imaging unit configured to image the inspection target, the second imaging unit being provided on a side of the inspection operator, wherein the control unit is configured to perform control for associating an inspection target image that is an image captured by the second imaging unit, the measurement information image, and the inspection pass/fail determination result and storing the inspection target image, the measurement information image, and the inspection pass/fail determination result in the storage unit. With this configuration, when the inspection result is verified or analyzed after the inspection, the inspection target image and the measurement information image which are associated with the inspection pass/fail determination result can be read out from the storage unit. As a result, after the inspection, the inspection result can be verified and analyzed by using the information in which the measurement information image, the inspection pass/fail determination result, and the inspection target image are associated with each other.

In this case, preferably, the aircraft inspection support device further includes a second imaging unit mounting member configured to mount the second imaging unit on a head of the inspection operator. With this configuration, since the image corresponding to the field of view of the inspection operator including the inspection target can be imaged by the second imaging unit, the image (inspection target image) corresponding to the field of view of the inspection operator can be more effectively stored in the storage unit in association with the measurement information image and the inspection pass/fail determination result. Further, since the inspection operator does not need to move the second imaging unit because of the second imaging unit mounting member, the information in which the measurement information image, the inspection pass/fail determination result, and the inspection target image are associated with each other can be stored in the storage unit without increasing the workload of the inspection operator.

In the aircraft inspection support device provided with the storage unit and the control unit, preferably, the aircraft inspection support device further includes a voice acquisition unit configured to capture audio, wherein the control unit is configured to perform control for associating associate voice information acquired by the voice acquisition unit, the measurement information image, and the inspection pass/fail determination result and storing the voice information, the measurement information image, and the inspection pass/fail determination result in the storage unit. With this configuration, information including not only the measurement information image and the inspection pass/fail determination result but also information associated with these pieces of information can be stored in the storage unit. As a result, for example, in a case in which the voice information, such as, e.g., the contents spoken by the inspection operator during the inspection operation or the conversational speech between the inspection operator and the control room can be associated with the measurement information image and the inspection pass/fail determination result, the verification and the analysis can be performed after the inspection.

In the aircraft inspection support device provided with the storage unit and the control unit, preferably, the control unit is configured to perform control for storing the image captured by the measurement instrument-side display unit for displaying the measurement information composed of an analog signal in the storage unit as the measurement information image composed of a digital signal. With this configuration, for example, even in the case of using a specific measurement instrument associated with an aircraft model or an inspection target that can handle only analog signals or cannot output as digital signals, it is possible to store in the storage unit as a measurement information image composed of digital signals. As a result, the measurement information image composed of digital signals stored in the storage unit can be handled (e.g., transmitted/received) easily as digital signals.

In the aircraft inspection support device provided with the storage unit and the control unit, preferably, the aircraft inspection support device includes a communication unit configured to transmit/receive at least one of information in which the measurement information image and the inspection pass/fail determination result are associated and information on an aircraft inspection to/from the server device. With this configuration, even in a case where the information in which the measurement information image and the inspection pass/fail determination result are associated or the information on the aircraft inspection (for example, the information on the target aircraft model number, the inspection date and time, the inspection operator, the inspection portion, etc.) is stored in only one of the storage unit and the server device of the aircraft inspection support device, information can be exchanged via the communication unit. Further, since at least one of the information in which the measurement information image and the inspection pass/fail determination result are associated and the information on the aircraft inspection can be accumulated in the server device, it is possible to store the information in which a large number of measurement information images and inspection pass/fail determination results are related with each other or the information on the aircraft inspection without increasing the size of the storage unit of the aircraft inspection support device. Consequently, the accumulated information can be utilized by using the server device.

In the aircraft inspection support device according to the first aspect of the present invention, preferably, the operator-side display unit is configured as a head-mounted display for displaying an image of the inspection target and the measurement information image, the head-mounted display being configured to be mounted on a head of the inspection operator. With this configuration, both the inspection target and the measurement information image can be visually recognized without greatly changing the line of sight of the inspection operator, so that the inspection workability by the inspection operator can be further improved.

In the aircraft inspection support device according to the first aspect of the present invention, preferably, the operator-side display unit is configured as an arm-mounted display unit for displaying the measurement information image, the operator-side display unit being configured to be mounted on an arm of the inspection operator. With this configuration, the measurement information image can be easily visually recognized by the inspection operator by visually recognizing the arm part performing the inspection operation by the inspection operator. Further, the visibility is further improved by attaching to the arm on the side holding the measurement probe. Further, by placing the determination operation unit near the arm-mounted display unit itself or the arm-mounted display unit, it is possible for the inspection operator to perform the input operation easily while visually recognizing the measurement information image.

In the aircraft inspection support device according to the first aspect of the present invention, preferably, the operator-side display unit is attached to a measurement probe, the measurement probe being configured to be held by the inspection operator and connected to the measurement instrument to detect the measurement information. With this configuration, since the operator-side display unit enters the field of view of the inspection operator performing the inspection while visually recognizing the measurement probe, it is possible to visually recognize both the inspection target and the measurement information image without greatly changing the line of sight of the inspection operator.

In the aircraft inspection support device according to the first aspect of the present invention, preferably, the operator-side display unit includes a holding unit for holding an arrangement position with respect to the inspection target.

With this configuration, since the arrangement position of the operator-side display unit with respect to the inspection target can be maintained by the holding unit, the operator-side display unit can be easily visually recognized by the inspection operator performing the inspection operation near the inspection target.

In the aircraft inspection support device configured as the arm-held display unit, configured such that the inspection operator-side display unit is attached to the measurement probe, or provided with the holding unit, preferably, the aircraft inspection support device further includes: a storage unit configured to store the measurement information image; a control unit configured to perform control for acquiring the inspection pass/fail determination result related to the inspection target, associating the measurement information image and the inspection pass/fail determination result, and storing the measurement information image and the inspection pass/fail determination result in the storage unit; and a touch panel configured to receive the inspection pass/fail determination result as an input operation by the inspection operator and serve as the operator-side display unit. With this configuration, the inspection operator can operate the touch panel while visually recognizing the measurement information image to enter the inspection pass/fail determination result, thereby further improving the inspection workability of the inspection operator.

In the aircraft inspection support device according to the first aspect of the present invention, preferably, the aircraft inspection support device further includes a measurement instrument mounting member configured to mount the measurement instrument on the inspection operator. With this configuration, since the measurement instrument moves as the inspection operator moves, it is possible to improve the workability of the inspection operator performing the inspection work while moving.

In the aircraft inspection support device according to the first aspect of the present invention, preferably, the aircraft inspection support device further includes: a storage unit configured to store the measurement information image; a storage operation unit configured to receive an operation for storing the measurement information image; and a control unit configured to perform control for storing the measurement information image in the storage unit based on an operation received by the storage operation unit. With this configuration, the inspection operator can store the measurement information image at a desired timing other than the timing at which the inspection pass/fail determination result is acquired. As a result, the measurement information image can be arbitrarily stored even in a case where the inspection acceptance determination is not performed.

In this case, preferably, the storage operation unit is configured to be carried or held by the inspection operator. With this configuration, since the storage operation unit moves as the inspection operator moves, there is no need for the inspection operator to move in order to operate the storage operation unit, and therefore the operation for storing the measurement information image can be simplified.

In the aircraft inspection support device provided with the storage unit, the storage operation unit, and the control unit, preferably, the storage operation unit is attached to a measurement probe, the measurement probe being configured to be held by the inspection operator and connected to the measurement instrument to detect the measurement information. With this configuration, the operation of operating the measurement probe and the operation of storing the measurement information image can be easily performed by one hand. As a result, since the measurement information image can be easily stored while performing the inspection, the increase in the labor required for the inspection operator to store the measurement information image can be suppressed.

In the aircraft inspection support device provided with the storage unit, the storage operation unit, and the control unit, preferably, the storage operation unit is arranged so as to be spaced apart from the control unit, and the control unit is configured to perform control for acquiring a signal for an operation for storing the measurement information image received by the storage operation unit by radio communication. With such a configuration, signals for operations for storing the measurement information image can be transmitted to the control unit without connecting the storage operation unit and the control unit by wire. As a result, the inspection operator can easily perform operations because the inspection operator is not restricted in the movement and operation due to the cords for wired connections.

In the aircraft inspection support device provided with the storage unit, the storage operation unit, and the control unit, preferably, the control unit is configured to perform control for acquiring the inspection pass/fail determination result related the inspection target based on the measurement result of the measurement instrument-side display unit by the inspection operator, associating the measurement information image stored in the storage unit and the inspection pass/fail determination result based on the operation received by the storage operation unit, and storing the inspection pass/fail determination result in the storage unit. With this configuration, the inspection pass/fail determination result can be stored in association with the measurement information image stored at a desired time.

In the aircraft inspection support device provided with the storage unit, the storage operation unit, and the control unit, preferably, the control unit is configured to associate the measurement information image stored based on an operation to the storage operation unit and discrimination information that makes the stored measurement information image identifiable and store the discrimination information in the storage unit. With this configuration, the inspection operator can store the measurement information image stored at a desired time in association with the discrimination information separate from the inspection pass/fail determination result. As a result, it is possible to easily store each of the measurement information images in association with information other than the determination result of pass/fail. Therefore, it is possible to easily refer to information other than the inspection pass/fail determination result among a plurality of stored measurement information images. Further, for example, when the inspection operator associates predetermined information other than the inspection pass/fail determination result according to a certain criterion (for example, when tagging is performed on a measurement information image for discrimination according to a predetermined criterion), information corresponding to the predetermined criterion can be easily extracted from a plurality of stored measurement information images.

In the aircraft inspection support device provided with the storage unit, the storage operation unit, and the control unit, preferably, the aircraft inspection support device further includes: a second imaging unit configured to image the inspection target, the second imaging unit being configured to be provided on a side of the inspection operator; a storage operation unit configured to simultaneously or individually receive an operation for storing the inspection target image captured by the second imaging unit and an operation for storing the measurement information image; a storage unit configured to store at least one of the measurement information image and the inspection target image; and a control unit configured to perform control for storing at least one of the measurement information image and the inspection target image in the storage unit based on an operation received by the storage operation unit. With this configuration, the inspection operator can store, in addition to the measurement information image, the inspection pass/fail determination result at a desired timing. As a result, even in a case where the inspection pass/fail determination is not performed, it is possible to arbitrarily store at least one of the measurement information image and the inspection target image.

In this case, preferably, the control unit is configured to perform control for acquiring the inspection pass/fail determination result related to the inspection target based on the measurement result of the measurement instrument-side display unit by the inspection operator, associating at least one of the measurement information image and the inspection target image stored in the storage based on the operation received by the storage operation unit with the inspection pass/fail determination result, and storing the inspection pass/fail determination result in the storage unit. With this configuration, the inspection pass/fail determination result can be stored in association with at least one of the measurement information image and the inspection target image stored at a desired time.

In the aircraft inspection support device provided with the second imaging unit and configured to store the measurement information image and the inspection target image, preferably, the control unit is configured to perform control for storing the discrimination information in the storage unit in such a manner that at least one of the measurement information image and the inspection target image stored based on the operation on the storage operation unit and the discrimination information that makes at least one of the measurement information image and the inspection target image stored identifiable. By configuring as described above, the inspection operator can store the discrimination information different from the inspection pass/fail determination result, in association with at least one of the measurement information image and the inspection target image stored at a desired time. As a result, since the information other than the inspection pass/fail determination result can be easily stored in association with at least one of the measurement information image and the inspection target image, information other than the inspection pass/fail determination result can be easily referenced from at least one of the plurality of stored measurement information images and inspection target images. Further, for example, in a case where the inspection operator associates predetermined information other than the inspection pass/fail determination result in accordance with a certain criterion (for example, when tagging is performed on at least one of the measurement information image and the inspection target image for determination in accordance with a predetermined criterion), information corresponding to the predetermined criterion can be easily extracted from at least one of the plurality of stored measurement information images and inspection target images.

An aircraft inspection support method according to a second aspect of the present invention includes: capturing a measurement information image displayed on a measurement instrument-side display unit of a specific measurement instrument associated with a model of an aircraft or an inspection target of an aircraft component, the measurement instrument-side display unit being configured to display measurement information on the inspection target; and displaying the measurement information image by an operation-side display unit so as to be visible to an inspection operator who is performing an inspection operation near the inspection target.

In the aircraft inspection support method according to the second aspect of the present invention, by configuring as described above, in the same manner as in the aircraft inspection support device according to the first aspect of the present disclosure, it is possible to provide an aircraft inspection support method capable of simplifying the inspection operation by reducing the number of inspection operators required or the load even in a case where a specific measurement instrument associated with an aircraft model or an inspection target is used.

In the aircraft inspection support method according to the second aspect of the present invention, the aircraft inspection support method further includes: acquiring an inspection pass/fail determination result related to the inspection target based on a measurement result of the measurement instrument-side display unit by the inspection operator; associating the measurement information image and the inspection pass/fail determination result; and storing the measurement information image and the inspection pass/fail determination result associated with each other. With this configuration, after the inspection, the inspection result can be verified and analyzed based on the information in which the measurement information image and the inspection pass/fail determination result are associated with each other. Further, even in a case where the measurement instrument does not have a function of storing measurement information, the measurement information image can be stored.

In this case, preferably, the aircraft inspection support method further includes: transmitting information on the measurement information image and the inspection pass/fail determination result associated with each other from the aircraft inspection support device to the server device; and associating the information on an aircraft inspection which has been previously stored in the server device or which are to be stored in the server device after the inspection and the measurement information image and the inspection pass/fail determination result information associated with each other. By configuring as described above, since the information of the associated measurement information image and inspection pass/fail determination result acquired from the aircraft inspection support device and the information on the aircraft inspection can be accumulated in the server device in association with each other, the accumulated information can be utilized more effectively by using the server device.

In the aircraft inspection support method according to the second aspect of the present invention, the aircraft inspection support method further includes: receiving an operation for storing the measurement information image by a storage operation unit; and storing the measurement information image based on an operation received by the storage operation unit. With this configuration, the measurement information image can be stored at desired timings. As a result, even in a case where the pass/fail determination is not performed, the measurement information image can be arbitrarily stored.

Effects of the Invention

According to the present invention, as described above, even in a case where a specific measurement instrument associated with an aircraft model or an inspection target is used, the number of required inspection operators or loads can be reduced to simplify the inspection operation.

BRIEF DESCRIPTION OF THE DRAWINGS

FIG. 17 is a block diagram showing a configuration of a mobile information terminal according to a fourth modification of the first to sixth embodiments.

FIG. 18 is a block diagram illustrating a configuration of an imaging unit according to a fifth modification of the first to sixth embodiments.

FIG. 19 is a schematic diagram illustrating a configuration of a measurement instrument mounting member according to a sixth modification of the first to sixth embodiments.

FIG. 20 is a block diagram showing a configuration of an inspection support apparatus according to a reference example.

FIG. 25 is a block diagram showing a configuration of an aircraft inspection support device according to the sixth embodiment.

FIG. 26 is a schematic diagram showing a configuration of an aircraft inspection support device according to the sixth embodiment.

FIG. 27 is a diagram for explaining a configuration of a storage operation panel according to the sixth embodiment.

EMBODIMENTS FOR CARRYING OUT THE INVENTION

Hereinafter, embodiments in which the present invention is embodied will be described with reference to the attached drawings.

First Embodiment

Referring to FIG. 1 to FIG. 6, a configuration of an aircraft inspection support device 100 according to a first embodiment of the present invention will be described.

Figure 1:
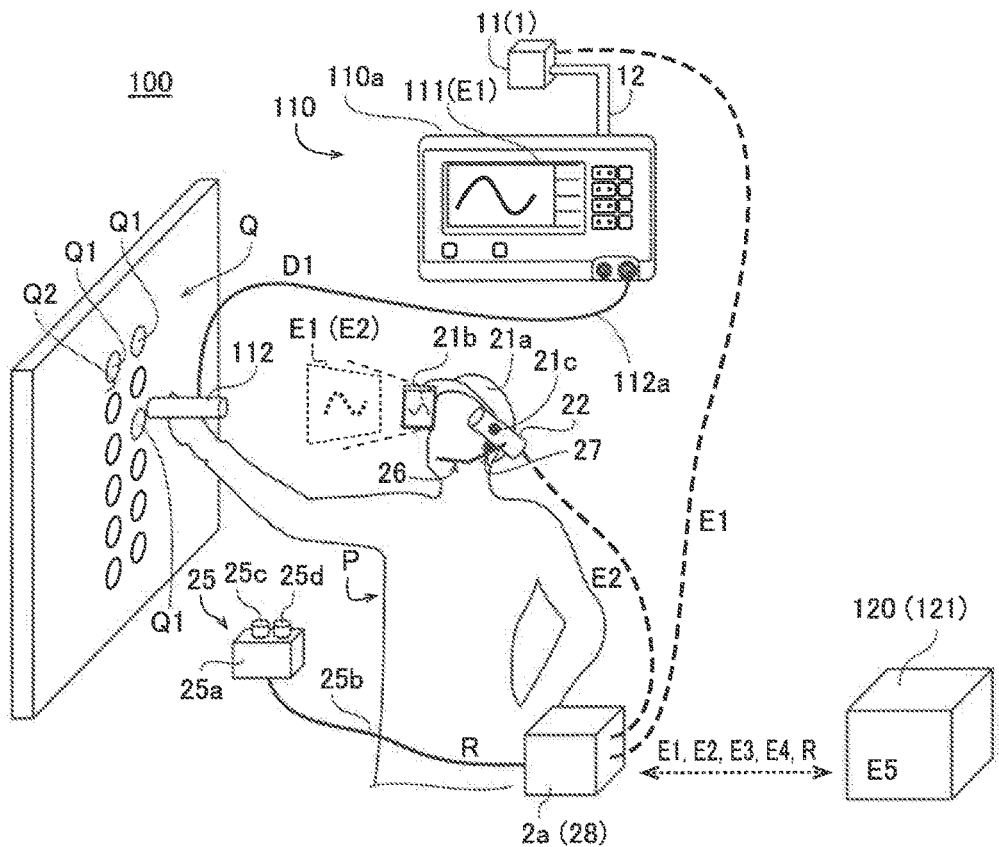
FIG. 1 is a schematic diagram showing a configuration of an aircraft inspection support device according to a first embodiment.

As shown in FIG. 1, the aircraft inspection support device 100 according to the first embodiment is configured as a device for supporting an inspection operator P who performs an inspection operation on an inspection target Q by using a measurement instrument 110 near the inspection target Q. Specifically, the inspection target Q denotes a rivet Q1 for joining a plurality of plates constituting a fuselage of an aircraft and a portion Q2 of a plate near the rivet Q1. That is, the inspection target Q is the rivet fastened portion and the vicinity of the rivet fastened portion. The term "near the inspection target Q" is described to mean, for example, a range of a position (a position capable of being accessed the inspection target Q) where the inspection operator P can touch the measurement probe 112 with respect to the inspection target Q, and specifically, the range including, for example, the inspection target Q and a working position (a scaffolding portion) facing the inspection target Q.

Figure 2:
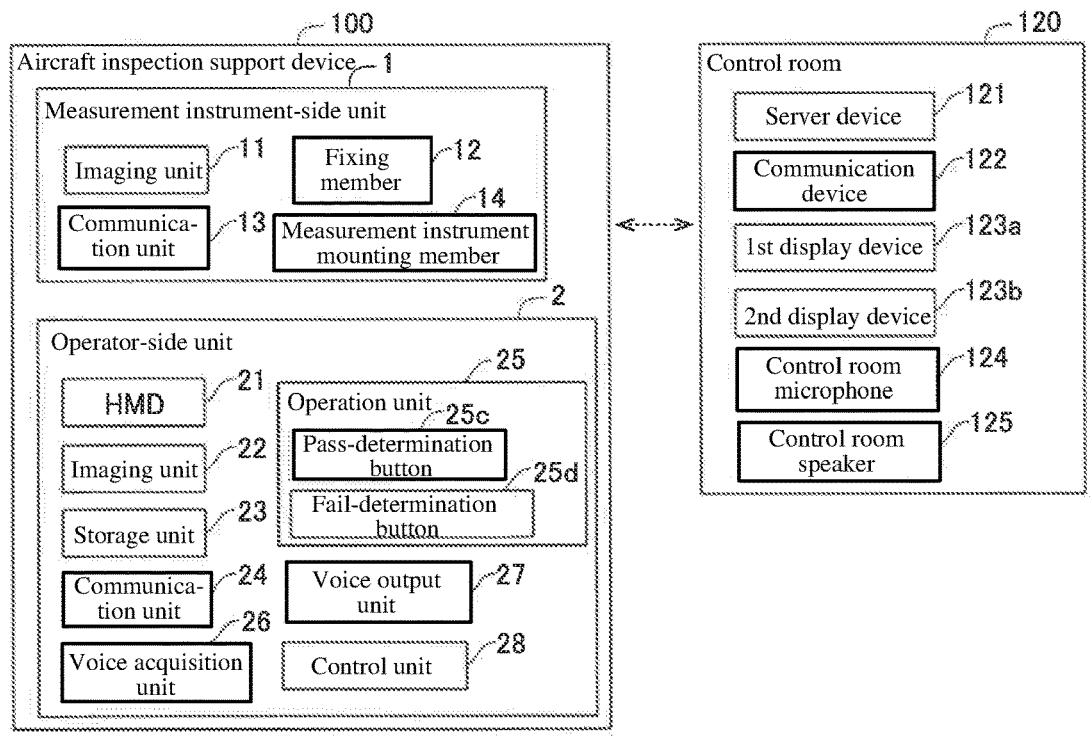
FIG. 2 is a diagram showing a configuration of the aircraft inspection support device and a control room according to the first embodiment.

The aircraft inspection support device 100 is configured as an information system that exchanges the information (data) with a server device 121 provided in a control room 120 by radio communication. As shown in FIG. 2, the control room 120 is provided with a communication device 122, a first display device 123a, a second display device 123b, a control room microphone 124, and a control room speaker 125.

The server device 121 is configured to store (manage and accumulate) the information (images, etc.) acquired from the aircraft inspection support device 100 via the communication device 122. Further, in the server device 121, a database is constructed based on the information (information E4 of a fixed form to be described later) acquired from the aircraft inspection support device 100, and this information base is configured so that the information acquired from the aircraft inspection support device 100 can be compared with newly acquired information (see FIG. 6).

The communication device 122 is configured to perform radio communication with the aircraft inspection support device 100. The first display device 123a is configured to display a measurement information image E1, which will be described later, which is an image acquired via the communication device 122. The second display device 123b is configured to display an inspection target image E2, which will be described later, which is an image acquired via the communication device 122. The control room microphone 124 is configured to acquire voice information of a controller (not shown). The control room speaker 125 is configured to output voice information of the inspection operator P acquired via the communication device 122.

The distance between a plurality of rivets Q1 is, for example, about 1 to several inches. As shown in FIG. 1, the plurality of rivets Q1 is arranged in a matrix on a plate. Thus, a single aircraft is provided with several tens of thousands of rivets Q1. In this inspection, the fatigue condition of the rivet Q1 and whether or not cracking has occurred from the rivet hole at the portion Q2 of the plate, etc., are inspected for all rivets Q1 using the measurement instrument 110. The inspection operator P performs the inspection, for example, in a state in which the inspection operator is on a scaffold provided along the aircraft's fuselage. In the first embodiment, the inspection operator P is one person.

The measurement instrument 110 is configured as, for example, an eddy current flaw detection device or an ultrasonic flaw detection device. The measurement instrument 110 is a specific measurement instrument corresponding to a maintenance manual prepared by an aircraft manufacturer or a maintenance rule of an aircraft maintenance company approved by an aviation administration of each country (e.g., the U.S. Federal Aviation Administration (FAA)). That is, an older selected measurement instrument 110 is a specific measurement instrument associated with an aircraft model or an inspection target Q (e.g., each portion of an aircraft or s maintenance member). The measurement instrument 110 does not have a function of storing a measurement information image and does not have a function of performing data communication. That is, the measurement instrument 110 is configured as an analog-type device without using a digital signal.

As shown in FIG. 1, the measurement instrument 110 includes a measurement instrument body 110a, a measurement instrument-side display unit 111, and a measurement probe 112. The measurement instrument body 110a includes a box-shaped housing. The measurement instrument-side display unit 111 is provided on one side surface of the measurement instrument body 110a. Also, the measurement instrument-side display unit 111 is configured, for example, as a cathode ray tube, a liquid crystal display, a needle-to-scale combination, or as an indicator lamp. The measurement instrument-side display unit 111 is configured to display the measurement information D1 (analog signal) from the measurement probe 112 as a measurement information image E1. The measurement information image E1 is configured, for example, as a waveform, a numerical value, a shake position of a hand, or lighting of an indicator lamp. Note that the measurement instrument-side display unit 111 is an example of the "measurement instrument-side display unit" recited in claims.

The measurement probe 112 is connected to the measurement instrument body 110a via a cable 112a and is configured to transmit the measurement information D1 (analog signal) to the measurement instrument body 110a. The measurement probe 112 is configured to be grippable by the inspection operator P and is configured to be, for example, a pen-shape.

(Configuration of Measurement Instrument-Side Unit)

The aircraft inspection support device 100 includes a measurement instrument-side unit 1 and an operator-side unit 2. As shown in FIG. 2, the measurement instrument-side unit 1 includes an imaging unit 11, a fixing member 12, a communication unit 13, and a measurement instrument mounting member 14. The imaging unit 11 is an example of the "first imaging unit" recited in claims.

Figure 3:
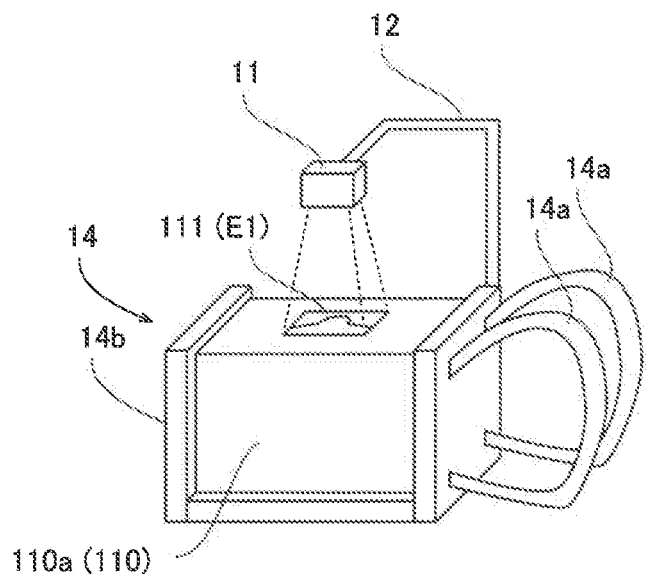
FIG. 3 is a diagram schematically illustrating a configuration of a measurement instrument-side unit according to the first embodiment.

As shown in FIG. 3, the imaging unit 11 is configured to image the measurement information image E1 of the measurement instrument-side display unit 111 of the specific measurement instrument 110 associated with an aircraft model or an inspection target Q. The imaging unit 11 is fixed in the relative position with respect to the measurement instrument 110 having the measurement instrument-side display unit 111 for displaying the measurement information D1 related to the inspection target Q and is configured to capture the image of the measurement information image E1 displayed on the measurement instrument-side display unit 111. For example, the imaging unit 11 is configured by a camera, or a combination of light detecting elements and optical components (mirrors, lens and filters). Further, the imaging unit 11 is configured to be capable of capturing a still image or a moving image.

The fixing member 12 is configured to fix the imaging unit 11 with respect to the measurement instrument 110 (measurement instrument-side display unit 111). The imaging unit 11 is disposed at a (front) position facing the measurement instrument-side display unit 111 by the fixing member 12. For example, the fixing member 12 is configured as a coupling member (joint) for fixedly coupling the imaging unit 11 and the measurement instrument 110. For example, the fixing member 12 is formed in an arm shape connecting the sides of the imaging unit 11 and the measurement instrument 110.

The communication unit 13 is configured to transmit the measurement information image E1 captured by the imaging unit 11 as radio signals composed of digital signals to the communication unit 24 of the operator-side unit 2. For example, the measurement information image E1 is continuously transmitted to the communication unit 24 as a moving image.

The measurement instrument mounting member 14 includes an operator-side mounting portion 14a and a measurement instrument holder 14b. The operator-side mounting portion 14a is formed, for example, in a belt-like shape capable of hanging on both shoulders of the inspection operator P. The measurement instrument holder 14b is configured as a support member for holding the measurement instrument 110 on the rear side of the inspection operator P in a state in which the measurement instrument holder 14a is mounted on the inspection operator P.

(Configuration of Operator-Side Unit)

The operator-side unit 2 includes, as shown in FIG. 2, a head-mounted display (hereinafter referred to as "HMD") 21, an imaging unit 22, a storage unit 23, a communication unit 24, an operation unit 25, a voice acquisition unit 26, a voice output unit 27, a control unit 28, and a controller box 2a (see FIG. 1). That is, the aircraft inspection support device 100 is configured as an HMD system. Note that the HMD 21 is an example of the "operator-side display unit" recited in claims. Further note that the imaging unit 22 is an example of the "second imaging unit" recited in claims. The communication unit 24 is an example of the "transmission unit" recited in claims. The operation unit 25 is an example of the "determination operation unit" recited in claims.

As shown in FIG. 1, the controller box 2a is configured to be carried or worn by the inspection operator P. For example, the controller box 2a is configured to be mounted on the waist of the inspection operator P using belts or the like. The controller box 2a includes a storage unit 23, a communication unit 24, and a control unit 28.

The HMD 21 is provided so that its position relative to the measurement instrument 110 (measurement instrument-side display unit 111) can be changed. The HDM 21 is configured to visually display the measurement information image E1 for the inspection operator P. The HMD 21 is configured to display the measurement information image E1 captured by the imaging unit 11 immediately (in real time). The HMD 21 is configured to be mounted on the head of the inspection operator P and display the image (inspection target image E2) of the inspection target Q captured by the imaging unit 22 and the measurement information image E1. The HMD 21 includes an HMD mounting member 21*a*. The HMD mounting member 21*a* is, for example, formed in a belt shape to be worn on the head of the inspection operator P, or has a helmet shape (see FIG. 1). The HMD mounting member 21*a* is one example of the "second imaging unit mounting member" as recited in claims. The inspection target image E2 includes, for example, the image of the rivet Q1 and the image of the portion Q2 of the plate.

Figure 4:
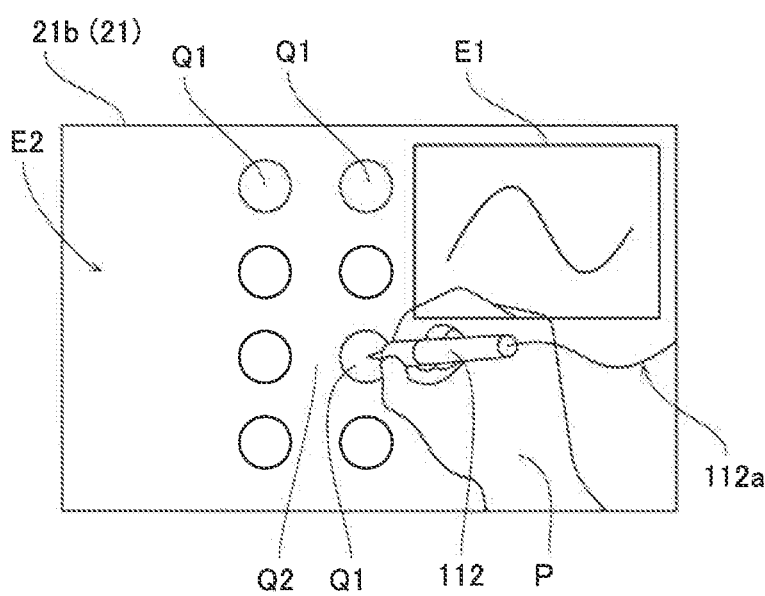
FIG. 4 is a diagram for explaining an HMD display screen according to the first embodiment.

As shown in FIG. 1, the display screen 21*b* of the HMD 21 is fixed to the HMD mounting member 21*a* and arranged between the eye of the inspection operator P and the inspection target Q, and is formed in, for example, a visor shape. As shown in FIG. 4, the display screen 21*b* can make is possible to visually recognize a scene (a scene in an area corresponding to the inspection target image E2) viewed through the display screen 21*b* and the measurement information image E1 displayed on the display screen 21*b* in a superimposed manner. For example, the HMD 21 is configured to display the measurement information image E1 in a translucent state in a partial region of the display screen 21*b*.

The imaging unit 22 is configured to be provided on the inspection operator P and image the inspection target Q. The imaging unit 22 is mounted on the head of the inspection operator P and is configured as a so-called wearable camera. The imaging unit 22 is fixed to the HMD mounting member 21*a*. Thus, the HMD mounting member 21*a* is configured to mount the imaging unit 22 on the head of the inspection operator P. Note that the imaging unit 22 is an example of the "second imaging unit" recited in claims.

Further, the imaging unit 22 is provided with, for example, optical components (such as lenses) and image pickup elements. The imaging unit 22 is configured to image the inspection target Q. Specifically, the imaging unit 22 is configured to image the area corresponding to the field of view of the inspection operator P, including the inspection target Q, as an inspection target image E2. With this, the imaging position can be specified by the inspection target image E2. Note that the imaging position information may be added to the inspection target image E2. In this case, the inspection target image E2 may be configured by, for example, only the image of the single rivet Q1 or only the image of the portion Q2 of the plate.

Further, the HMD 21 is configured to display (project) the inspection target image E2 captured by the imaging unit 22 on the display screen 21*b*. As a result, the inspection operator P can directly confirm the inspection target image E2 projected on the HMD 21, so that the orientation, the arrangement position, etc., of the imaging unit 22 can be modified in some circumstances.

Further, the HMD 21 includes an HMD operation unit 21*c* (see FIG. 1), so that the imaging area of the imaging unit 22 may be switched and the display content of the display screen 21*b* (whether or not to display the measurement information image E1 and the inspection target image E2, etc.) may be changed, based on the input operation by the inspection operator P to the HMD operation unit 21*c*.

Further, the imaging unit 22 is configured to be able to perform radio communication (or wired communication) via the control unit 28 and the communication unit 24. The imaging unit 22 is configured to transmit the captured inspection target image E2, for example, as a video, via the communication unit 24 to the control unit 28.

The storage unit 23 is configured as a nonvolatile memory. The storage unit 23 is configured to store the measurement information image E1, the inspection target image E2, and the like, based on a command from the control unit 28. Specifically, the storage unit 23 is configured to be detachable with respect to the controller box 2*a*. For example, the storage unit 23 is configured as an SD-card (registered mark). With this, the storage unit 23 is configured to be able to move or copy the stored measurement information image E1, inspection target image E2, and the like, to the server device 121 of the control room 120. Note that the storage unit 23 may be directly attached to the controller box 2*a*, or may be externally attached to the controller box 2*a* by arranging cables so as to be connected to the controller box 2*a*.

The communication unit 24 is configured to be able to wirelessly communicate with the communication unit 13 and is configured to be able to wirelessly communicate with the imaging unit 22. The communication unit 24 is configured to be able to wirelessly communicate with the communication device 122 in the control room 120.

The operation unit 25 is configured to receive an input operation as an inspection pass/fail determination result R with respect to the inspection target Q based on the measurement result of the measurement instrument-side display unit 111 by the inspection operator P. As shown in FIG. 1, in the operation unit 25, for example, the operation unit body 25*a* is connected to the controller box 2*a* by a cable 25*b*. The operation unit 25 is held by the inspection operator P, attached to the arm of the inspection operator P, or disposed in the vicinity (e.g., scaffolding, etc.) of the inspection operator P. The operation unit 25 includes a pass-determination button 25*c* for receiving the input operation to the pass-determination result R1 as the inspection pass/fail determination result R and a fail-determination button 25*d* for receiving the input operation to the fail-determination result R2 as the inspection pass/fail determination result R.

For example, the operation unit 25 is configured to transmit the pass-determination result R1 to the control unit 28, based on the pressing of the pass-determination button 25*c* by the inspection operator P. Further, the operation unit 25 is configured to transmit the fail-determination result R2 to the control unit 28, based on the pressing of the fail-determination button 25*d* by the inspection operator P.

The voice acquisition unit 26 is fixed to, for example, the HMD 21 (HMD mounting member 21*a*) and is arranged near the mouth of the inspection operator P. The voice acquisition unit 26 is configured, for example, as a microphone for collecting the utterances of the inspection operator P. The voice acquisition unit 26 is configured to transmit the acquired sound to the control unit 28 as voice information E3. The voice information E3 includes at least one of the voice information of the inspection operator P and the voice information of the controller transmitted from the control room 120. That is, the voice information E3 is, for example, the voice information of conversations between the inspection operator P and the controller, or the voice memo of the inspection operator P or the controller.

The voice output unit 27 is fixed to, for example, the HMD 21 (HMD mounting member 21*a*) and is arranged near the ear of the inspection operator P. The voice output unit 27 is configured as, for example, a speaker or an earphone for acquiring the voice information of the controller transmitted from the control room 120 from the control unit 28 and speaking this voice information.

<Configuration of Control Unit>

The control unit 28 is configured to control each unit of the aircraft inspection support device 100. For example, the control unit 28 includes a central processing unit (CPU: Central Processing Unit), an imaging device (GPU: Graphics Processing Unit), and the like. In the first embodiment, as shown in FIG. 5 and FIG. 6, the control unit 28 is configured to acquire the inspection pass/fail determination result R related to the inspection target Q, associate the measurement information image E1 with the inspection pass/fail determination result R, and perform control for storing the measurement information image E1 and the inspection pass/fail determination result R in the storage unit 23.

Figure 5:
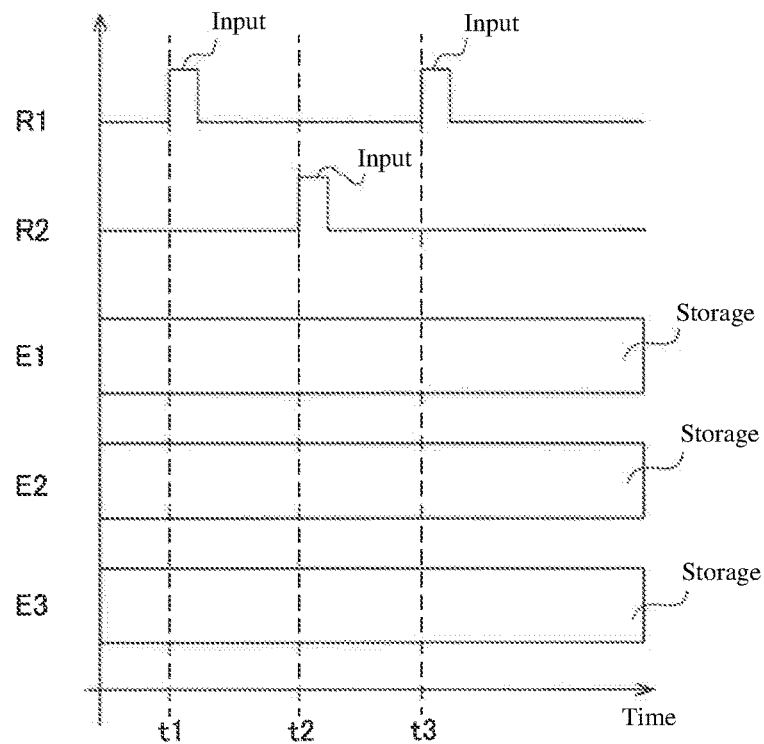
FIG. 5 is a diagram for explaining processing related to the association by the first embodiment.

Specifically, as shown in FIG. 5, the control unit 28 acquires the measurement information image E1 from the measurement instrument-side unit 1, acquires the inspection target image E2 from the imaging unit 22, and acquires the voice information E3 from the control room 120 and the voice acquisition unit 26. The control unit 28 is configured to store the measurement information image E1, the inspection target image E2, and the voice information E3 in the storage unit 23.

Figure 6:
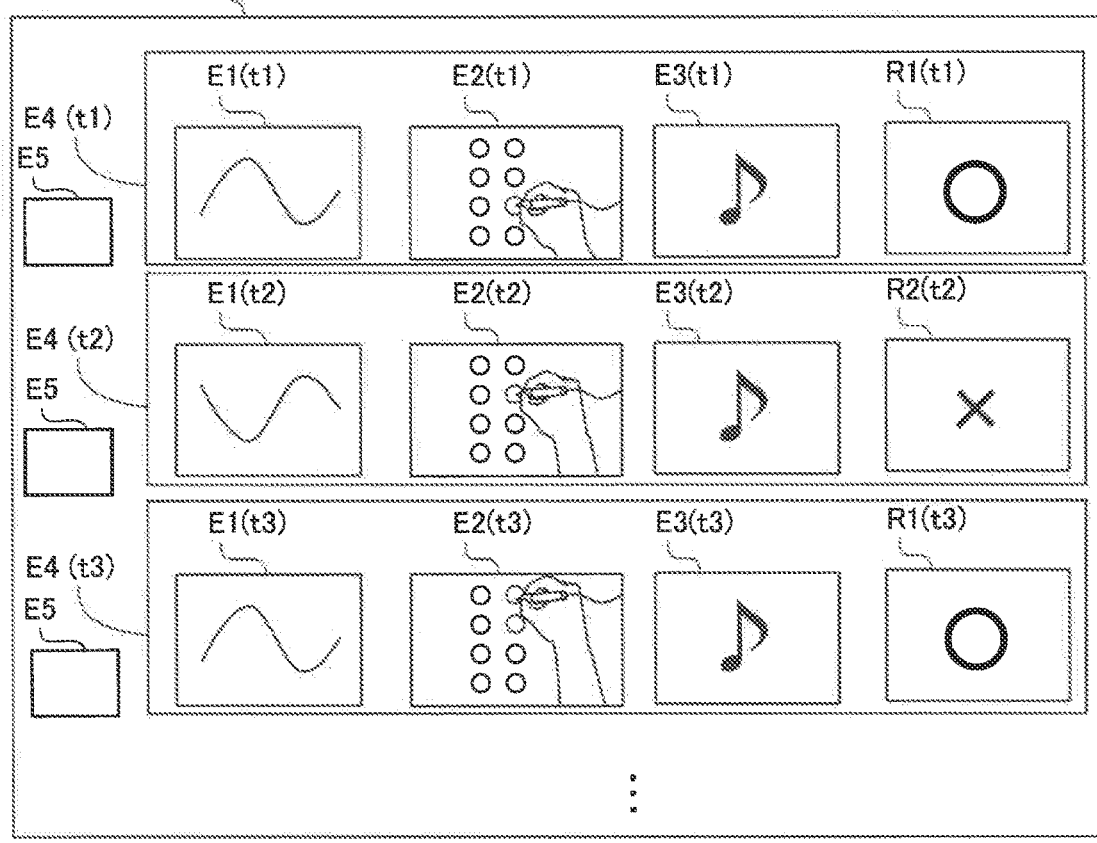
FIG. 6 is a diagram for explaining the processing of storing associated information by the first embodiment.

Further, as shown in FIG. 6, the control unit 28 is configured to perform control for storing the measurement information image E1, the inspection target image E2, the voice information E3, and the inspection pass/fail determination result R (R1 or R2) in the storage unit 23 in association with the measurement information image E1, the inspection target image E2, the voice information E3, and the inspection pass/fail determination result R (R1 or R2), at the time point at which the inspection pass/fail determination result R is acquired (for example, the time point t1, the time point t2, and the time point t3). The time point at which the inspection pass/fail determination result R is acquired is, for example, the time point at which an input operation to the operation unit 25 is received. That is, the "association" means, for example, that all of the acquired measurement information image E1, inspection target image E2, and voice information E3 are stored in the storage unit 23, and that the information at the time at which the inspection pass/fail determination result R was acquired is stored in a marked (linked) state. In other words, the measurement information image E1, the inspection target image E2, and the voice information E3 are stored in a synchronized manner at the time when the inspection pass/fail determination result R is acquired. In FIG. 6, the images of the measurement information image E1 and the inspection target image E2 are moving images, but the images of the measurement information image E1 and the inspection target image E2 may be still images acquired individually.

The control unit 28 is configured to store the information E4 in which the measurement information image E1, the inspection target image E2, the voice information E3, and the inspection pass/fail determination result R (R1 or R2) are associated with each other, as information (images) obtained by combining the information E1 to E3 with a standard form in the storage unit 23. The control unit 28 is configured to transmit the information E4 to the server device 121 via the communication unit 24. For example, the information E4 is configured to be editable as a database in the storage unit 23 or the server device 121. The measurement information image E1 and the inspection target image E2 are stored in the storage unit 23 as an image format (moving image format or still image format), such as, e.g., a JPEG (Joint Photographic Experts Group format), a MPEG (Moving Picture Experts Group format, and an AVI (Audio Video Interleave) format, which are composed of digital signals. As described above, the control unit 28 is configured to perform control for storing the images captured by the measurement instrument-side display unit 111 displaying the measurement information D1 composed of analog signals in the storage unit 23, as the measurement information image E1 composed of digital signals. Note that the information E4 is an example of the "information in which the measurement information image and the inspection pass/fail determination result are associated" recited in claims.

The server device 121 of the control room 120 is configured such that the information E5 related to an aircraft inspection (see FIG. 1) is stored in advance or after the inspection. The server device 121 receives the information E4 from the aircraft inspection support device 100 and stores the information E4 and the information E5 related to the aircraft inspection in association with each other. For example, the information E5 related to an aircraft inspection is composed of information, such as, e.g., the target model number, the inspection date and time, the inspection operator, and an inspection portion.

[Aircraft Inspection Support Method by First Embodiment]

Figure 7:
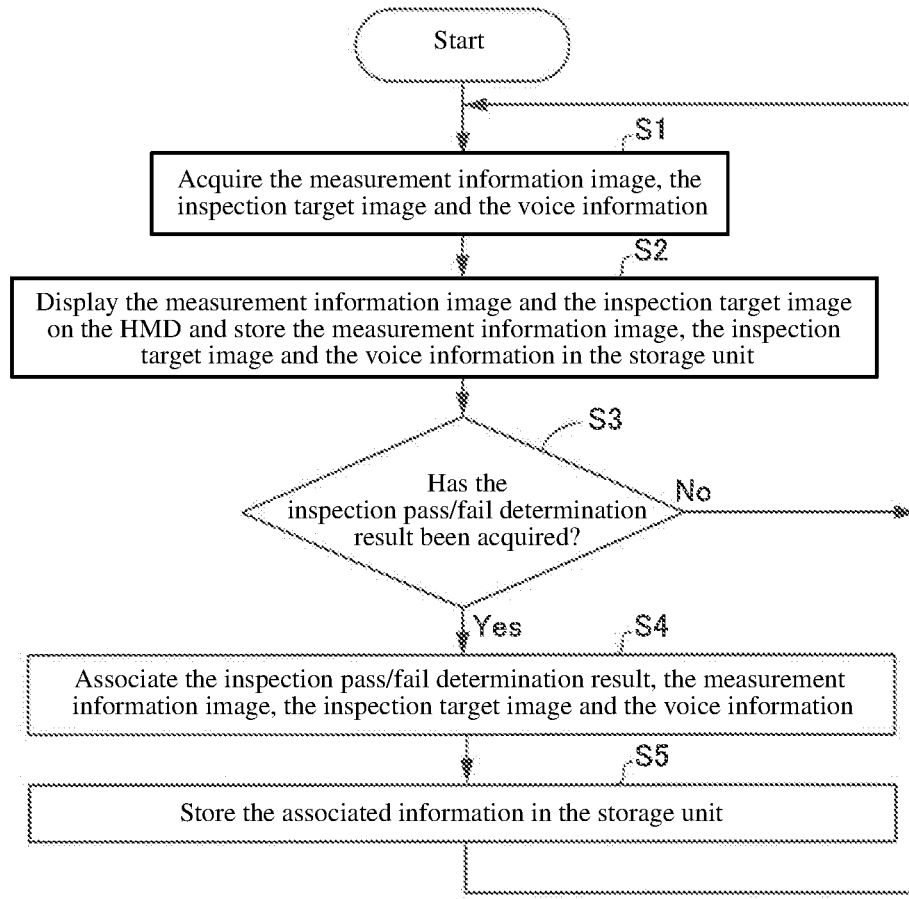
FIG. 7 is a flowchart for explaining an aircraft inspection support method according to the first embodiment.

Next, referring to FIG. 7, an aircraft inspection support method according to the first embodiment will be described. This aircraft inspection support method is a method for supporting an inspection method corresponding to a maintenance manual prepared by an aircraft manufacturer and a maintenance rule of an aircraft maintenance company approved by an aviation authority of each country (e.g., U.S. Federal Aviation Administration (FAA)). In the first embodiment, the control processing for an aircraft inspection support method is performed by the control unit 28.

In Step S1, the measurement information image E1, the inspection target image E2, and the voice information E3 are obtained. Thereafter, in Step S2, the measurement information image E1 and the inspection target image E2 are displayed on the HMD 21, and the measurement information image E1, the inspection target image E2, and the voice information E3 are stored in the storage unit 23. Thereafter, the processing proceeds to Step S3.

In Step S3, it is determined whether or not the inspection pass/fail determination result R has been acquired. When the inspection pass/fail determination result R has been acquired, the processing proceeds to Step S4, and when the inspection pass/fail determination result R has not been acquired, the processing returns to Step S1.

In Step S4, the measurement information image E1, the inspection target image E2, the voice information E3, and the inspection pass/fail determination result R are associated (see FIG. 5 and FIG. 6). Thereafter, in Step S5, the associated information E4 is stored in the storage unit 23. Thereafter, the processing returns to Step S1.

[Effects of First Embodiment]

In this first embodiment, the following effects can be obtained.

In the first embodiment, by configuring as described above, even in a case where the inspection operator P is positioned near the inspection target Q and is away from the specific measurement instrument 110 (measurement instrument-side display unit 111), and the measurement instrument-side display unit 111 cannot be directly visually recognized, the inspection operator P can perform the inspection operation near the inspection target Q while viewing the measurement information image E1 by the HMD 21. Therefore, an inspection operator P for directly visualizing the measurement instrument-side display unit 111 is not required in addition to the inspection operator P for performing the inspection operation near inspection target Q. Therefore, the number of required inspection operators P can be reduced even in a case where a specific measurement instrument 110 associated with an aircraft model or an inspection target (e.g., a portion of an aircraft or a maintenance part) is used. As a result, the inspection work can be simplified and the burden can be reduced since the confirmation work, etc., of the inspection content between inspection operators P is not required.

Further, in the first embodiment, as described above, the HMD 21 is configured to be carried by or mountable on the inspection operator P. As a result, since the HMD 21 moves as the inspection operator P moves, the operation for moving the HMD 21 by the inspection operator P is not required, and the operation load on the inspecting operation of the inspection operator P can be reduced.

Further, in the first embodiment, as described above, the aircraft inspection support device 100 is provided with the storage unit 23 for storing the measurement information image E1 and the control unit 28. The control unit 28 is configured to perform control for acquiring the inspection pass/fail determination result R related to the inspection target Q based on the measurement result of the measurement instrument-side display unit 111 by the inspection operator P, associating the measurement information image E1 and the inspection pass/fail determination result R, and storing the measurement information image E1 and the inspection pass/fail determination result R in the storage unit. With this, even in a case where the specific measurement instrument 110 does not have a function of storing the measurement information D1 and the function of performing data communication, the information (associated data) in which the measurement information image E1 and the inspection pass/fail determination result R are associated with each other can be stored in the storage unit 23. When the inspection result is verified or analyzed after the inspection, the information (associated data) in which the measurement information image E1 and the inspection pass/fail determination result R are associated with each other can be read out from the storage unit 23. That is, after the inspection, the inspection result can be verified and analyzed by using the information in which the measurement information image E1 and the inspection pass/fail determination result R are associated with each other. As a result, the inspection result can be verified and analyzed more effectively as compared with the case in which the measurement information image E1 and the inspection pass/fail determination result R are not associated with each other.

Further, in the first embodiment, as described above, the control unit 28 is configured to perform control for associating the measurement information image E1 and the inspection pass/fail determination result R at the time when the inspection pass/fail determination result R is acquired, and storing the measurement information image E1 and the inspection pass/fail determination result R in the storage unit 23. With this, the information in which the measurement information image E1 and the inspection pass/fail determination result R are associated with each other is stored in the storage unit 23 at the time when the inspection pass/fail determination result R is acquired (in real time). Therefore, the information can be stored more efficiently as compared with the case in which the operation for associating the measurement information image E1 and the inspection pass/fail determination result R is performed after the inspection.

Further, in the first embodiment, as described above, the aircraft inspection support device 100 is provided with the operation unit 25 for receiving the input operation by the inspection operator P as the inspection pass/fail determination result R. The control unit 28 is configured to perform control for associating the measurement information image E1 and the inspection pass/fail determination result R at the time of receiving the input operation to the operation unit 25, and storing the measurement information image E1 and the inspection pass/fail determination result R in the storage unit 23. This makes it possible to associate the measurement information image E1 and the inspection pass/fail determination result R at the time when the inspection operator P performs the input operation, so that it is possible to easily associate the measurement information image E1 and the inspection pass/fail determination result R at the time when the inspection operator P intends to associate them.

Further, in the first embodiment, as described above, the aircraft inspection support device 100 is provided with the imaging unit 22 provided on the side of the inspection operator P for capturing the inspection target Q. The control unit 28 is configured to perform control for associating the inspection target image E2 captured by imaging unit 22, the measurement information image E1, and the inspection pass/fail determination result R, and storing the inspection target image E2, the measurement information image E1, and the inspection pass/fail determination result R in the storage unit 23. This allows the inspection target image E2 and the measurement information image E1 associated with the inspection pass/fail determination result R to be read from the storage unit 23 when the inspection result is verified or analyzed after the inspection. As a result, after the inspection, the inspection result can be verified and analyzed by using the information in which the measurement information image E1, the inspection pass/fail determination result R, and the inspection target image E2 are associated with each other.

Further, in the first embodiment, as described above, the aircraft inspection support device 100 is provided with the HMD mounting member 21a for mounting the imaging unit 22 on the head of the inspection operator P. With this, an image corresponding to the field of view of the inspection operator P including the inspection target Q can be captured by the imaging unit 22, so that the image (inspection target image E2) corresponding to the field of view of the inspection operator P can be more effectively stored in the storage unit 23 in association with the measurement information image E1 and the inspection pass/fail determination result R. Further, since the inspection operator P does not need to move the imaging unit 22 because of the HMD mounting member 21a, it is possible to store the information in which the measurement information image E1, the inspection pass/fail determination result R, and the inspection target image E2 are associated with each other in the storage unit 23 without increasing the workload of the inspection operator P.

Further, in the first embodiment, as described above, the aircraft inspection support device 100 is provided with the voice acquisition unit 26 for acquiring voice. The control unit 28 is configured to perform control for associating the voice information E3 acquired by the voice acquisition unit 26, the measurement information image E1, and the inspection pass/fail determination result R and storing the voice information E3, the measurement information image E1, and the inspection pass/fail determination result R in the storage unit 23. With this, not only the measurement information image E1 and the inspection pass/fail determination result R but also the information in which the voice information E3 is associated with the measurement information image E1 and the inspection pass/fail determination result R can be stored in the storage unit 23. As a result, for example, in a state in which the voice information E3, such as, e.g., the contents spoken by the inspection operator P during the inspection operation and the conversational speech between the inspection operator P and the control room are associated with the measurement information image E1 and the inspection pass/fail determination result R, the verification and the analysis can be performed after the inspection.

Further, in the first embodiment, as described above, the control unit 28 is configured to perform control for storing the image captured by the measurement instrument-side display unit 111 displaying the measurement information D1 composed of analog signals in the storage unit 23 as the measurement information image E1 composed of digital signals. Thus, for example, even in a case where the specific measurement instrument 110 associated with an aircraft model or an inspection target Q is a device that handles only analog signals, and the measurement instrument 110 cannot generate (store) information composed of digital signal information, the information can be stored in the storage unit 23 as the measurement information image E1 composed of digital signal information. As a result, the measurement information image E1 composed of digital signals stored in the storage unit 23 can be easily handled (e.g., transmitted/received) as digital signals.

Further, in the first embodiment, as described above, the aircraft inspection support device 100 is provided with the communication unit 24 that transmits the information on the measurement information image E1 and the inspection pass/fail determination result R to the server device 121. This makes it possible to store the information in which the measurement information image E1 and the inspection pass/fail determination result R are associated with each other in the server device 121. Therefore, it is possible to store the information in which many measurement information images E1 and inspection pass/fail determination results R are associated with each other without increasing the size of the storage unit 23 of the aircraft inspection support device 100. As a result, the accumulated information can be utilized by using the server device 121.

Further, in the first embodiment, as described above, the aircraft inspection support device 100 is provided with the HMD 21 to be mounted on the head of the inspection operator P for displaying the image (inspection target image E2) and the measurement information image E1 of the inspection target Q captured by the imaging unit 22. This makes it possible to visually recognize both the inspection target Q and the measurement information image E1 without greatly changing the line of sight of the inspection operator P, so that it is possible to further improve the inspection workability by the inspection operator P. Further, during the inspection, the inspection operator P can adjust the orientation, the arrangement position, and the like, of the imaging unit 22 while confirming the inspection target image E2 displayed on the HMD 21. Further, the inspection target image E2 can be stored in the storage unit 23 while confirming the displayed inspection target image E2.

Further, in the first embodiment, as described above, the aircraft inspection support device 100 is provided with the measurement instrument mounting member 14 for mounting the measurement instrument 110 on the inspection operator P. With this, since the measurement instrument 110 moves in accordance with the movement of the inspection operator P, it is possible to improve the workability of the inspection operator P performing the inspection work while moving.

Further, in the first embodiment, as described above, the information E4 is transmitted from the aircraft inspection support device 100 to the server device 121, and the information E4 is associated with the information E5 related to the aircraft inspection stored in advance in the server device 121 or stored after the inspection in the server device 121. With this, the information E4 acquired from the aircraft inspection support device 100 and the information E5 related to the aircraft inspection can be stored in the server device 121 in association with each other, so that the stored information can be utilized more effectively by using the server device 121.

Second Embodiment

Next, referring to FIG. 8 to FIG. 10, a configuration of an aircraft inspection support device 200 according to a second embodiment of the present invention will be described. In the second embodiment, unlike the first embodiment described above configured to display the measurement information image E1 on the HMD 21, the measurement information image E1 is configured to be displayed on a touch panel 241 of a mobile information terminal 240. Note that the same configuration as that of the above-described first embodiment is denoted by the same reference numeral in the figures, and the description thereof will be omitted.

Figure 8:
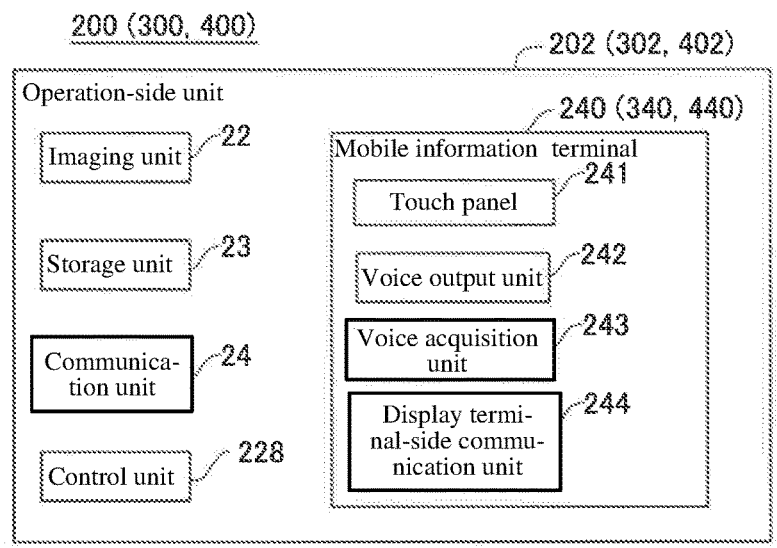
FIG. 8 is a block diagram showing a configuration of an operator-side unit according to second to fourth embodiments.

The aircraft inspection support device 200 according to the second embodiment is provided with, as shown in FIG. 8, an operator-side unit 202. The operator-side unit 202 includes a mobile information terminal 240, a control unit 228, an imaging unit 22, a storage unit 23, and a communication unit 24. Note that the mobile information terminal 240 is an example of the "operator-side display unit" and an example of the "arm-mounted display" recited in claims.

Figure 9:
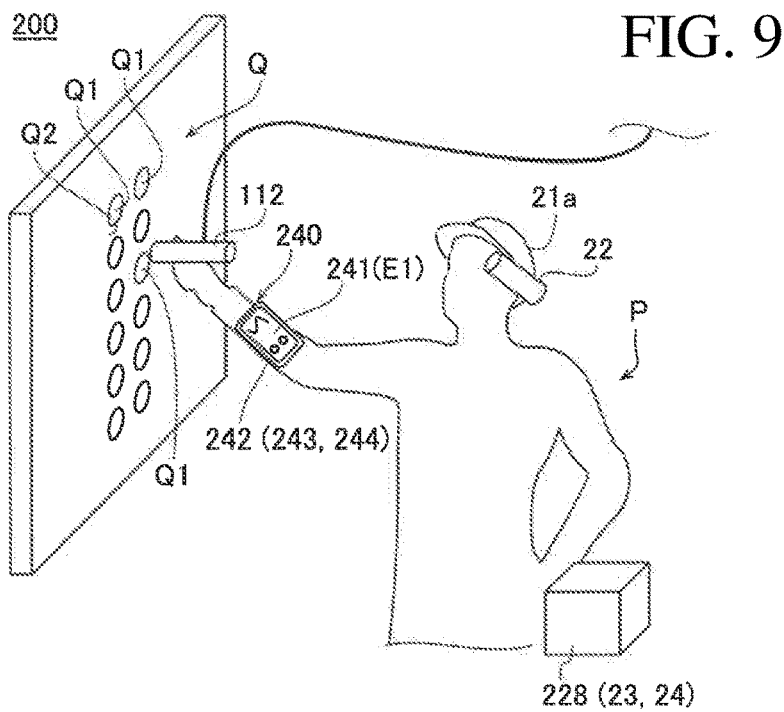
FIG. 9 is a schematic diagram showing a configuration of an aircraft inspection support device according to the second embodiment.
Figure 10:
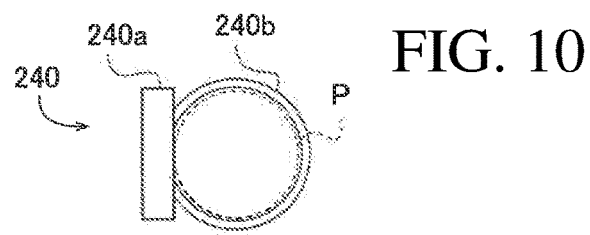
FIG. 10 is a diagram for explaining a configuration for mounting a mobile information terminal according to the second embodiment to an inspection operator.

As shown in FIG. 9 and FIG. 10, the mobile information terminal 240 is configured to be mounted on the arm of the inspection operator P to show the measurement information image E1. Specifically, the mobile information terminal 240 includes a terminal main body 240a and a belt 240b. It is configured such that the terminal main body 240a is attached (fixed) to the inspection operator P with the belt 240b wound around the arm of the inspection operator P. The mobile information terminal 240 includes a touch panel 241, a voice output unit 242, a voice acquisition unit 243, and an information terminal communication unit 244. The touch panel 241 is an example of the "determination operation unit", the "operator-side display unit", and the "arm-mounted display" recited in claims.

Further, the mobile information terminal 240 is configured to acquire the measurement information image E1 from the control unit 228 to display the measurement information image E1 on the touch panel 241 and is configured to receive the inspection pass/fail determination result R, as an input operation by the inspection operator P, by the touch panel 241. Here, in the second embodiment, the touch panel 241 is configured to receive the input operation by the inspection operator P as the aircraft inspection information E5 in addition to the inspection pass/fail determination result R. The control unit 228 is configured to perform control for storing the information E5 related to the aircraft inspection acquired from the touch panel 241 in the storage unit 23. For example, the information E5 related to the aircraft inspection is composed of information, such as, e.g., the target model number, the inspection date and time, the inspection operator, and the inspection portion. The inspection pass/fail determination result R may include not only the above-described pass-determination result R1 and the fail-determination result R2 but also comment information (character information or graphic information) based on the input operation of the inspection operator P to the touch panel 241.

Further, the mobile information terminal 240 is configured to acquire voice information, etc., of the controller from the control unit 228 and output it by the voice output unit 242. The mobile information terminal 240 is configured to acquire the voice information E3 of the inspection operator P by the voice acquisition unit 243 and transmit it to the control room 120 via the control unit 228 and the communication unit 24. Note that the rest of the configuration of the second embodiment is the same as that of the first embodiment.

[Effects of Second Embodiment]

In this second embodiment, the following effects can be obtained.

In the second embodiment, as described above, the aircraft inspection support device 200 is provided with the mobile information terminal 240 to be mounted on the arm of the inspection operator P and is configured as an arm-mounted display for displaying the measurement information image E1. With this, the measurement information image E1 can be easily visually recognized by the inspection operator P by visually recognizing the arm part performing the inspection operation.

In the second embodiment, as described above, the aircraft inspection support device 200 is provided with the touch panel 241 for receiving the inspection pass/fail determination result R as the input operation by inspection operator P and also serving as an operator-side display unit. With this, the inspection operator P can operate the touch panel 241 while visually recognizing the measurement information image E1 to input the inspection pass/fail determination result R, thereby further improving the inspection workability of the inspection operator P.

Further, in the second embodiment, as described above, the touch panel 241 is configured to receive the input operation by the inspection operator P as the information E5 related to the aircraft inspection in addition to the inspection pass/fail determination result R. Further, the control unit 228 is configured to perform control for storing the information E5 related to the aircraft inspection obtained from the touch panel 241 in the storage unit 23. This makes it possible to use the information E5 (e.g., information about the target model number, the inspection date and time, the inspection operator, the inspection portion, etc.) related to the aircraft inspection stored in the storage unit 23, in addition to the measurement information image E1 and the inspection pass/fail determination result R, when the inspection result is verified or analyzed after the inspection. As a result, the verification and analysis after the inspection can be performed in more detail. The other effects of the second embodiment are the same as those of the first embodiment.

Third Embodiment

Next, referring to FIG. 8, FIG. 11, and FIG. 12, a configuration of an aircraft inspection support device 300 according to the third embodiment of the present invention will be described. In this third embodiment, unlike the aircraft inspection support device 200 according to the second embodiment provided with the mobile information terminal 240 to be attached to the arm of the inspection operator P, a mobile information terminal 340 is attached to the measurement probe 112. Note that the same component as that of the first and second embodiments will be denoted by the same reference numeral in the figures, and the descriptions thereof will be omitted.

The aircraft inspection support device 300 according to the third embodiment is provided with an operator-side unit 302 as shown in FIG. 8. The operator-side unit 302 is provided with a mobile information terminal 340. The mobile information terminal 340 includes a touch panel 241 for displaying the measurement information image E1.

Figure 11:
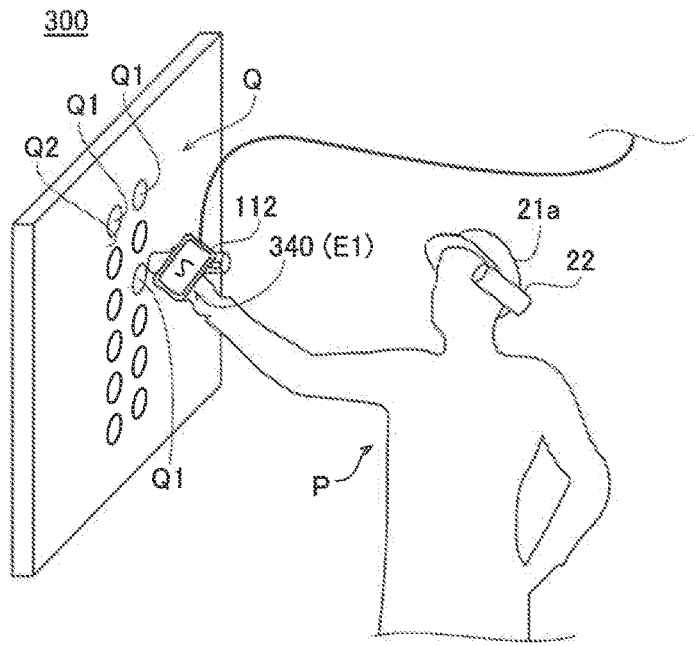
FIG. 11 is a schematic diagram showing a configuration of an aircraft inspection support device according to the third embodiment.
Figure 12:
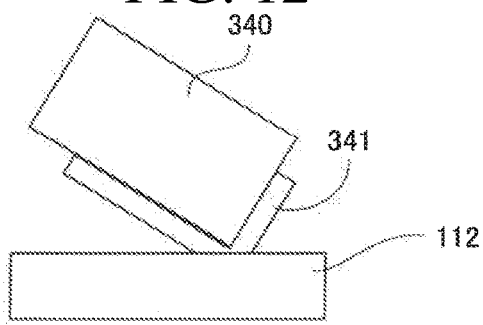
FIG. 12 is a diagram for explaining a configuration for mounting a mobile information terminal according to the third embodiment to an inspection operator.

The mobile information terminal 340 is attached to the measurement probe 112 to be held by the inspection operator P as shown in FIG. 11. Specifically, as shown in FIG. 12, the aircraft inspection support device 300 is provided with a mounting member 341 for mounting the mobile information terminal 340 on the measurement probe 112. The mounting member 341 is fixed to the measurement probe 112 and is fixed to the mobile information terminal 340. The mounting member 341 is configured as a member (joint) for fixing the measurement probe 112 and the mobile information terminal 340 to each other. Note that the mobile information terminal 340 is an example of the "operator-side display unit" and an example of the "arm-mounted display" recited in claims. The rest of the configuration of the third embodiment is the same as that of the second embodiment.

[Effects of Third Embodiment]

In the third embodiment, as described above, the following effects can be obtained.

In the third embodiment, as described above, the mobile information terminal 340 is configured to be held by the inspection operator P and attached to the measurement probe 112 connected to the measurement instrument 110 to detect the measurement information D1. With this, since the mobile information terminal 340 enters the field of view of the inspection operator P performing the inspection operation while visually recognizing the measurement probe 112, both the inspection target Q and the measurement information image E1 can be visually recognized without greatly changing the line of sight of the inspection operator P. The other effects of the third embodiment are similar to those of the first and second embodiments.

Fourth Embodiment

Next, referring to FIG. 8 and FIG. 13, a configuration of an aircraft inspection support device 400 according to a fourth embodiment of the present invention will be described. In the fourth embodiment, unlike the aircraft inspection support device 200 of the second embodiment having the mobile information terminal 240 to be mounted on the arm of the inspection operator P, the holding unit 441 holds the mobile information terminal 240 in the position with respect to the inspection target Q. The same configuration as that of the above-mentioned first to third embodiments are denoted by the same reference numeral in the figures, and the descriptions thereof will be omitted.

The aircraft inspection support device 400 according to the fourth embodiment is provided with, as shown in FIG. 8, an operator-side unit 402. The operator-side unit 402 includes a mobile information terminal 440. The mobile information terminal 440 includes a touch panel 241 for displaying the measurement information image E1.

Figure 13:
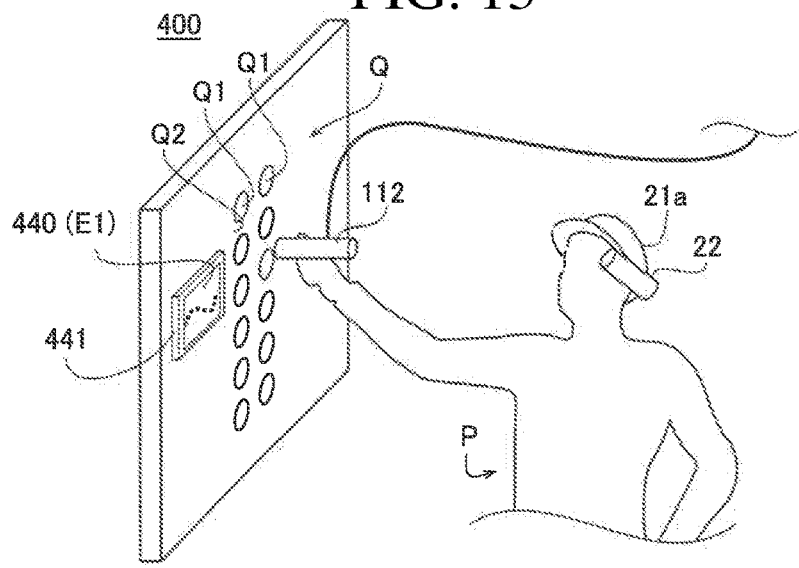
FIG. 13 is a schematic diagram showing a configuration of an aircraft inspection support device according to the fourth embodiment.

As shown in FIG. 13, the position of the mobile information terminal 440 with respect to the inspection target Q is held by a holding unit 441. Specifically, the holding unit 441 is removably attached to the fuselage of the aircraft by the magnetic force or the mechanical fixing method, and is configured to maintain the arrangement position of the mobile information terminal 440. Note that the mobile information terminal 440 is an example of the "operator-side display unit" and an example of the "arm-mounted display" recited in claims. The rest of the configuration of the fourth embodiment is the same as that of the second embodiment.

[Effects of Fourth Embodiment]

In this fourth embodiment, the following effects can be obtained.

In the fourth embodiment, as described above, the mobile information terminal 440 is provided with the holding unit 441 for maintaining the arrangement position with respect to the inspection target Q. As a result, since the holding unit 441 can maintain the arrangement position of the mobile information terminal 440 with respect to the inspection target Q, the mobile information terminal 440 can be easily visually recognized by the inspection operator P performing the inspection operation near the inspection target Q. The other effects of the fourth embodiment are similar to those of the first and second embodiments.

Fifth Embodiment

Next, referring to FIG. 21 to FIG. 23, a configuration of an aircraft inspection support device 1100 according to a fifth embodiment of the present invention will be described. In the fifth embodiment, unlike the aircraft inspection support device 200 of the second embodiment in which the measurement information image E1 and the inspection target image E2 are stored at the time of acquiring the inspection pass/fail determination result R, the measurement information image E1 and the inspection target image E2 are stored based on the operation to the storage operation unit 1151. The same configuration as that of the above-mentioned first to fourth embodiments are denoted by the same reference numeral in the figures, and the descriptions thereof will be omitted.

Figure 22:
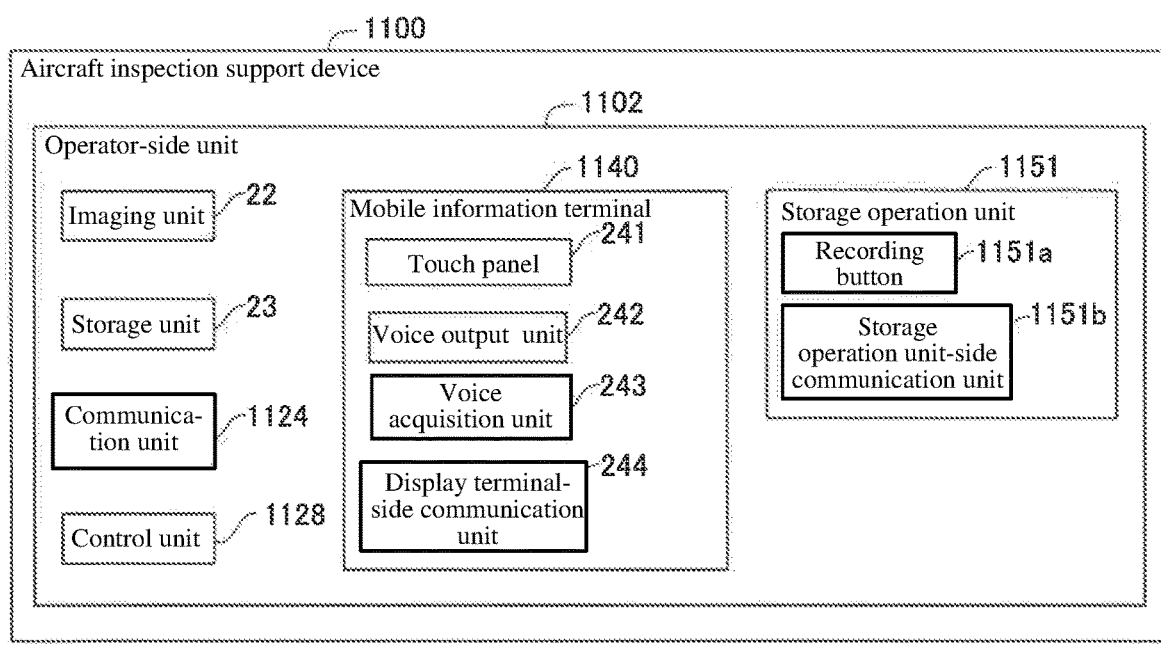
FIG. 22 is a block diagram showing a configuration of an operator-side unit according to the fifth embodiment.

The aircraft inspection support device 1100 according to the fifth embodiment is provided with an operator-side unit 1102, as shown in FIG. 22. The operator-side unit 1102 includes a communication unit 1124, a control unit 1128, a mobile information terminal 1140, and a storage operation unit 1151. A recording button 1151a is arranged on the storage operation unit 1151. The storage operation unit 1151 includes a storage operation unit-side communication unit 1151b. Note that the mobile information terminal 1140 is an example of the "operator-side display unit" and an example of the "arm-mounted display" recited in claims.

Figure 23:
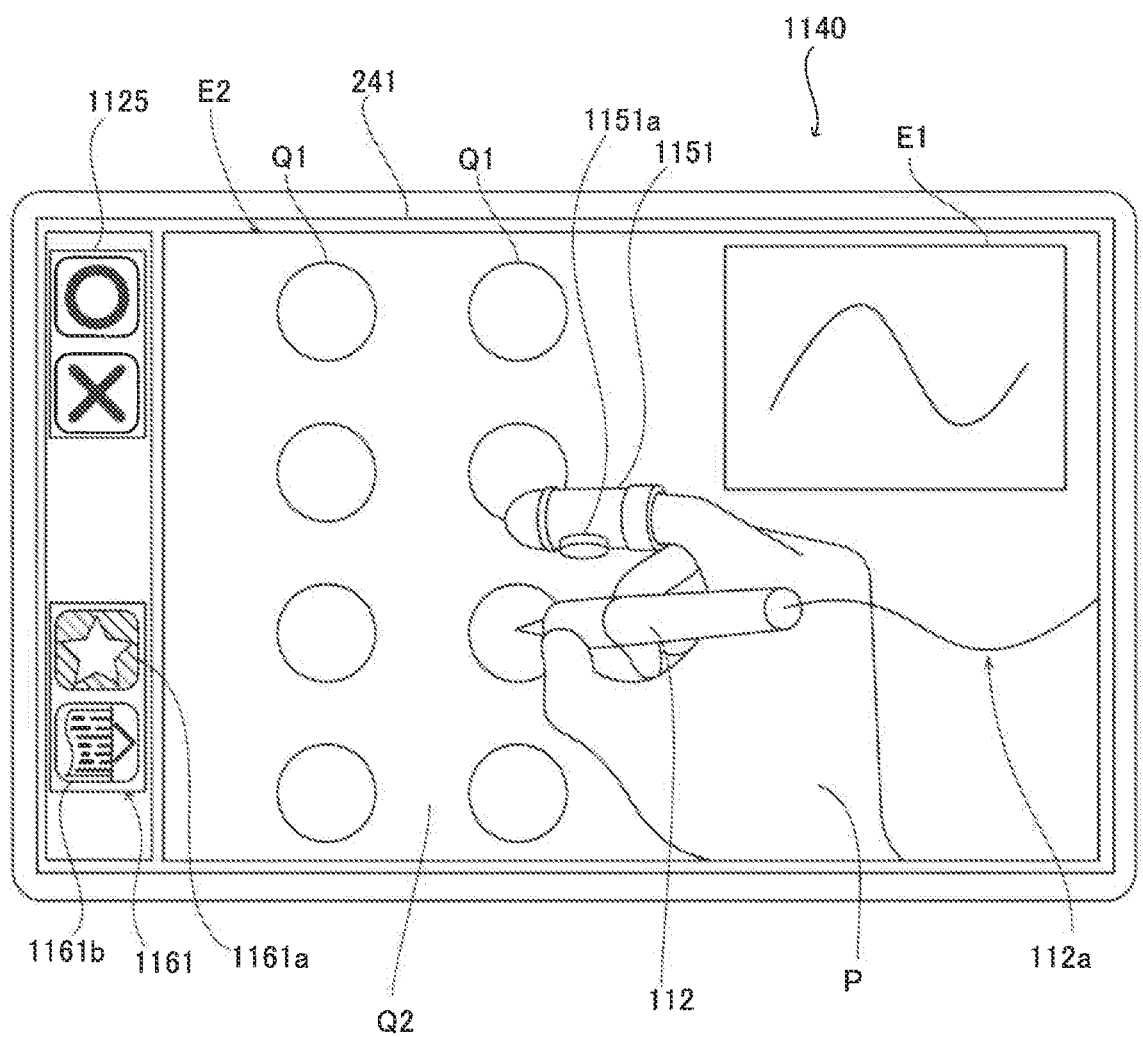
FIG. 23 is a diagram for explaining a display of a touch panel according to the fifth embodiment.

As shown in FIG. 23, the storage operation unit 1151 is configured to be carried or held by the inspection operator P. Specifically, the storage operation unit 1151 is configured such that a finger of the inspection operator P is inserted. The storage operation unit 1151 is configured to be held by (mounted on) the inspection operator P by being inserted by the finger of the inspection operator P. The storage operation unit 1151 is configured so that the inspection operator P can press the recording button 1151a in a state in which the storage operation unit 1151 is attached to the finger. Further, as shown in FIG. 22, the storage operation unit 1151 includes a storage operation unit-side communication unit 1151b. The storage operation unit-side communication unit 1151b is configured to be able to communicate with the communication unit 1124.

The storage operation unit 1151 is configured to receive the operation for storing the measurement information image E1 captured by the imaging unit 11 and the operation for storing the inspection target image E2 captured by the imaging unit 22. For example, the storage operation unit 1151 transmits a signal for storing the measurement information image E1 and the inspection target image E2 to the control unit 1128 via the storage operation unit-side communication unit 1151b based on the pressing of the recording button 1151a arranged on the storage operation unit 1151 by the inspection operator P. Further, the storage operation unit 1151 is arranged to be away from the control unit 1128.

Figure 21:
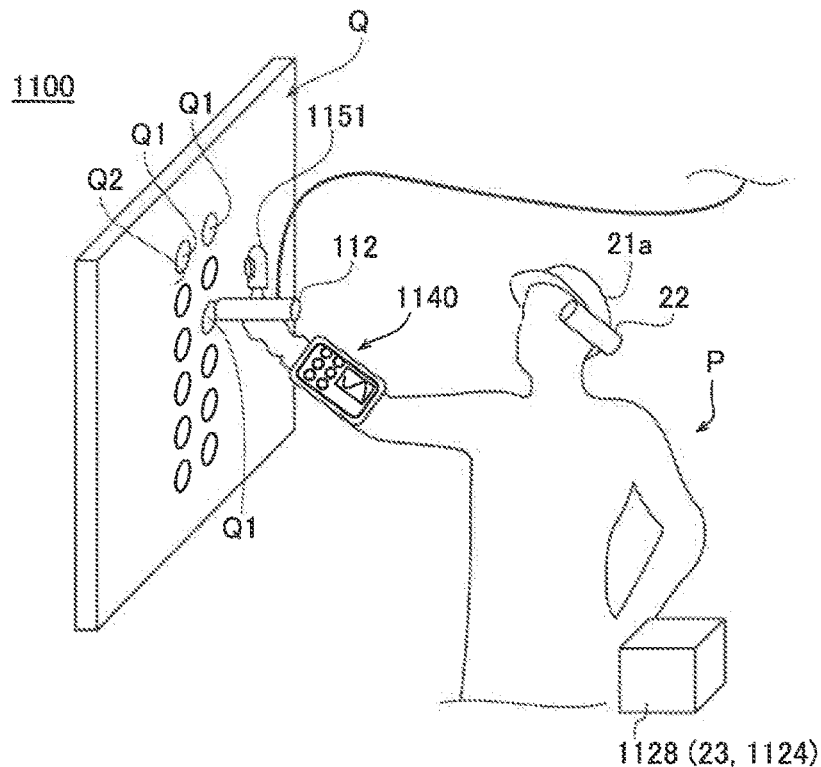
FIG. 21 is a schematic diagram showing a configuration of an aircraft inspection support device according to the fifth embodiment.

The mobile information terminal 1140 is mounted on the arm of inspection operator P as shown in FIG. 21. As shown in FIG. 23, the mobile information terminal 1140 is configured to display the measurement information image E1 and the inspection target image E2 on the touch panel 241. For example, the mobile information terminal 1140 displays the inspection target image E2 so as to be superimposed on the measurement information image E1 on the touch panel 241. Note that the mobile information terminal 1140 may be configured to display the measurement information image E1 and the inspection target image E2 side by side on the touch panel 241.

Further, the mobile information terminal 1140 is configured to receive the operation for acquiring the inspection pass/fail determination result R by the input operation to the touch panel 241. For example, as shown in FIG. 23, the mobile information terminal 1140 displays an inspection pass/fail determination result acquisition portion 1125 on the touch panel 241. Based on the input operation to the inspection pass/fail determination result acquisition portion 1125 displayed on the touch panel 241, the operation for acquiring the inspection pass/fail determination result R is received.

The mobile information terminal 1140 receives the operation for storing the tag information E6 in association with the measurement information image E1 and the inspection target image E2 stored in the storage unit 23. For example, as shown in FIG. 23, the mobile information terminal 1140 displays the tag information acquisition portion 1161 on the touch panel 241. The mobile information terminal 1140 receives the input operation to the tag information acquisition portion 1161 displayed on the touch panel 241 and transmits the signal for associating the tag information E6 with the measurement information image E1 and the inspection target image E2 stored in the storage unit 23 to the control unit 1128. That is, by operating the tag information acquisition portion 1161 displayed on the touch panel 241, the inspection operator P can store the tag information E6 in association with the desired measurement information image E1 and inspection target image E2 while visually recognizing the measurement information image E1 and the inspection target image E2 displayed on the touch panel 241.

The tag information E6 includes marker information for discriminating according to a predetermined criterion, such as, e.g., a star mark. The tag information E6 includes, for example, character information, such as, e.g., comments, input by the inspection operator P through operations on the touch panel 241. The tag information E6 is information for the inspection operator or another worker different from the inspection operator P to discriminate (extract) the measurement information image E1 and the inspection target image E2 associated with the tag information E6 from a plurality of measurement information images E1 and inspection target images E2 stored in the storage unit 23. Note that the tag information E6 is an example of the "discrimination information" recited in claims.

As shown in FIG. 23, the tag information acquisition portion 1161 includes a marker information acquisition portion 1161a and a character information acquisition portion 1161*b*. The Mobile information terminal 1140 receives an operation for acquiring marker information based on an input operation to the marker information acquisition portion 1161*a*. The mobile information terminal 1140 receives an operation for acquiring character information based on the input operation to the character information acquisition portion 1161*b*.

The communication unit 1124 is configured to be able to wirelessly communicate with the storage operation unit-side communication unit 1151*b* included in the storage operation unit 1151. The rest of the configuration of the communication unit 1124 is the same as that of the communication unit 24 according to the second embodiment.

<Configuration of Control Unit>

The control unit 1128 is configured to perform control of each part of the aircraft inspection support device 1100 in the same manner as in the control unit 228 according to the second embodiment.

The control unit 1128 performs control for storing the measurement information image E1 and the inspection target image E2 in the storage unit 23 based on the operation received by the storage operation unit 1151. That is, the control unit 1128 is configured to perform control for acquiring, by radio communication via the communication unit 1124, a signal on the operation for storing the measurement information image E1 and the inspection target image E2 received by the pressing of the recording button 1151*a* arranged on the storage operation unit 1151. The control unit 1128 performs control for storing the measurement information image E1 and the inspection target image E2 in the storage unit 23 based on the acquired signal. For example, in a case where the measurement information image E1 and the inspection target image E2 are moving images, the control unit 1128 stops the control for storing the measurement information image E1 and the inspection target image E2 in the storage unit 23 when the recording button 1151*a* is pressed again and the signal is acquired.

Further, the control unit 1128 is configured to perform control for acquiring the inspection pass/fail determination result R related to the inspection target Q based on the measurement result of the measurement instrument-side display unit 111 by the inspection operator P, associating the measurement information image E1 and the inspection target image E2 stored in the storage unit 23 with the inspection pass/fail determination result R based on the operation received by the storage operation unit 1151, and storing the inspection pass/fail determination result R in the storage unit 23. That is, the control unit 1128 acquires the inspection pass/fail determination result R based on the input operation for the inspection pass/fail determination result acquisition portion 1125 displayed on the touch panel 241. Then, the acquired inspection pass/fail determination result R is stored in the storage unit 23 in association with the measurement information image E1 and the inspection target image E2 stored in the storage unit 23.

Further, the control unit 1128 is configured to perform control for associating the measurement information image E1 and the inspection target image E2 stored based on the operation to the storage operation unit 1151 with the tag information E6 that makes the stored measurement information image E1 and inspection target image E2 distinguishable and storing the tag information E6 in the storage unit 23. That is, the control unit 1128 is configured to acquire the signal for associating the tag information E6 with the measurement information image E1 and the inspection target image E2 stored in the storage unit 23 based on the input operation to the tag information acquisition portion 1161 displayed on the touch panel 241. The control unit 1128 is configured to perform control for associating the tag information E6 with the measurement information image E1 and the inspection target image E2 stored in the storage unit 23 and storing the tag information E6 in the storage unit 23 based on the input operation to the tag information acquisition portion 1161 displayed on the touch panel 241.

The rest of the configuration of the fifth embodiment is the same as that of the second embodiment.

[Aircraft Inspection Support Method of Fifth Embodiment]

Figure 24:
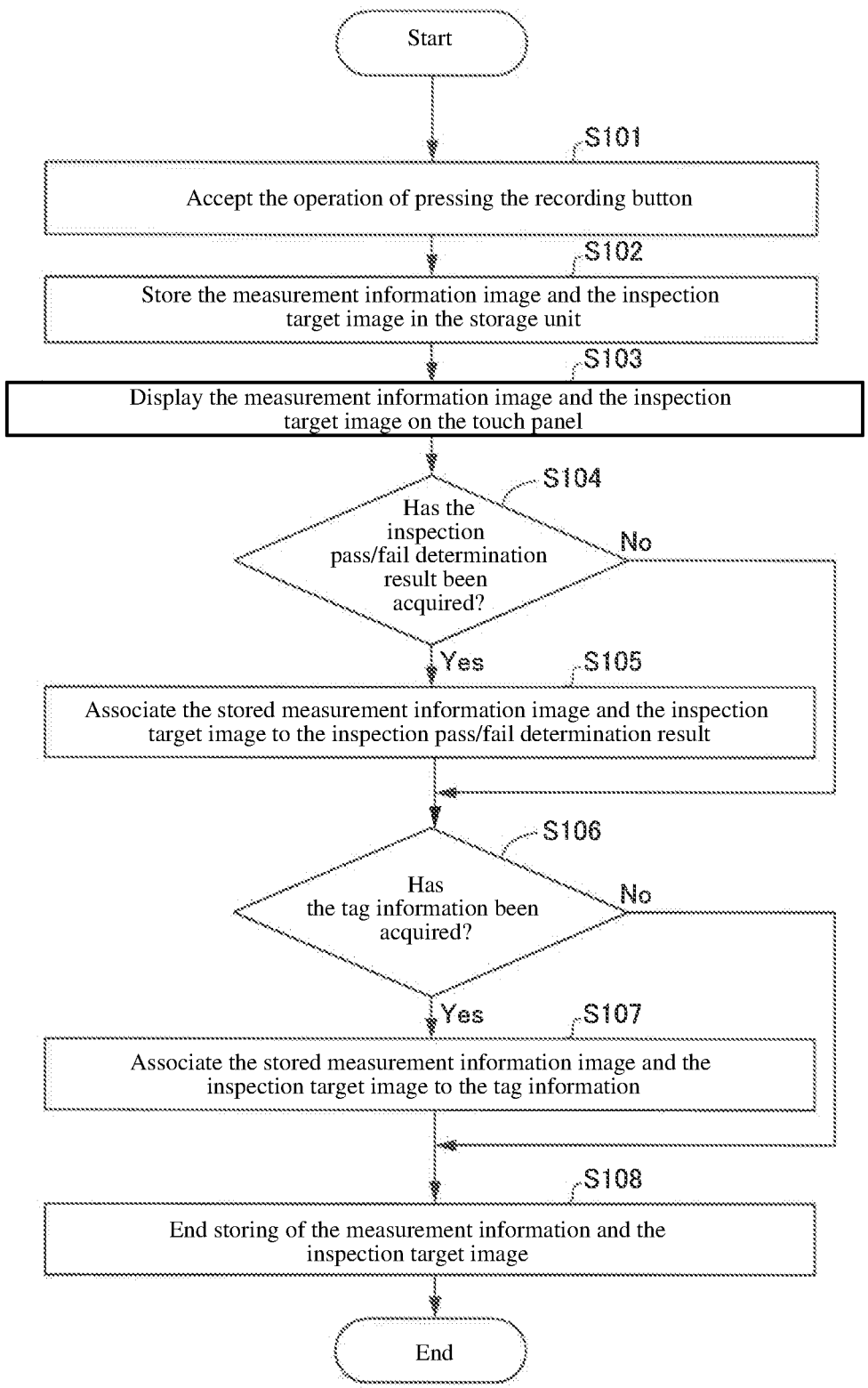
FIG. 24 is a diagram (flowchart) for explaining an aircraft inspection support method according to the fifth embodiment.

Next, referring to FIG. 24, an aircraft inspection support method according to a fifth embodiment will be described. This aircraft inspection support method is a method for supporting an inspection method corresponding to a maintenance manual prepared by an aircraft manufacturer or a maintenance rule of an aircraft maintenance company approved by an aviation authority of each country (e.g., the U.S. Federal Aviation Administration (FAA)). In the fifth embodiment, the control processing for the aircraft inspection support method is executed by the control unit 1128.

In Step S101, an operation for storing the measurement information image E1 and the inspection target image E2 is received by the storage operation unit 1151. That is, in Step S101, an operation of pressing the recording button 1151*a* included in the storage operation unit 1151 is received. Next, in Step S102, the measurement information image E1 and the inspection target image E2 are stored in the storage unit 23 based on the operation received by the storage operation unit 1151. Thereafter, in Step S103, the measurement information image E1 and the inspection target image E2 are displayed on the touch panel 241. Thereafter, the processing proceeds to Step S104.

In Step S104, it is determined whether or not the inspection pass/fail determination result R has been acquired. When the inspection pass/fail determination result R has been acquired, the processing proceeds to Step S105, and when the inspection pass/fail determination result R has not been acquired, the processing proceeds to Step S106.

In Step S105, the inspection pass/fail determination result R is stored in association with the measurement information image E1 and the inspection target image E2 stored in the storage unit 23. Thereafter, the processing proceeds to Step S106.

In Step S106, it is determined whether or not the tag information E6 has been acquired. That is, in Step S106, it is determined whether or not the input operation to the tag information acquisition portion 1161 displayed on the touch panel 241 has been acquired. When the tag information E6 has been acquired, the processing proceeds to Step S107, and when the tag information E6 has not been acquired, the processing proceeds to Step S108.

In Step S107, the tag information E6 is stored in association with the measurement information image E1 and the inspection target image E2 stored in the storage unit 23. Thereafter, the processing proceeds to Step S108.

In Step S108, the storage operation unit 1151 receives the operation for ending the storage of the measurement information image E1 and the inspection target image E2. That is, in Step S108, an operation of pressing the recording button 1151*a* included in the storage operation unit 1151 is received. Thereafter, the control of the aircraft inspection support device 1100 according to the fifth embodiment is terminated.

As for the control for acquiring the inspection pass/fail determination result R in Step S104 and Step S105 and the control for acquiring the tag information E6 in Step S105 and the tag information E6 in Step S107, either one of them may be performed first. In this embodiment, an example in which the measurement information image E1 and inspection target image E2 are moving images, but the measurement information image E1 and the inspection target image E2 may be still images. In a case where the measurement information image E1 and the inspection target image E2 are still images, the control for ending the storage in Step S108 is omitted.

[Effects of Fifth Embodiment]

In the fifth embodiment, the following effects can be obtained.

In the fifth embodiment, as described above, the aircraft inspection support device 1100 is provided with the storage unit 23 for storing the measurement information image E1, the storage operation unit 1151 for receiving an operation for storing the measurement information image E1, and the control unit 1128 for performing control for storing the measurement information image E1 in the storage unit 23 based on the operation received by the storage operation unit 1151. Thus, the inspection operator P can store the measurement information image E1 at a desired timing other than the timing at which the inspection pass/fail determination result R is acquired. As a result, the measurement information image E1 can be arbitrarily stored even in a case where the inspection pass/fail determination has not been performed.

In the fifth embodiment, as described above, the storage operation unit 1151 is configured to be carried or held by the inspection operator P. As a result, since the storage operation unit 1151 moves with the movement of the inspection operator P, there is no need for the inspection operator P to move in order to operate the storage operation unit 1151, and the operation for storing the measurement information image E1 can be simplified.

Further, in the fifth embodiment, as described above, the storage operation unit 1151 is arranged to be away from the control unit 1128, and the control unit 1128 is configured to perform control for acquiring the signal for the operation for storing the measurement information image E1 received by the storage operation unit 1151 by radio communication. With this, without connecting the storage operation unit 1151 and the control unit 1128 by wire, it is possible to transmit a signal about the operation for storing the measurement information image E1 to the control unit 1128. As a result, the inspection operator P can easily perform the operation because the movement and the operation of the inspection operator P are not restricted by the cords for wired connections.

In the fifth embodiment, as described above, the control unit 1128 is configured to perform control for acquiring the inspection pass/fail determination result R related to the inspection target Q based on the measurement result of the measurement instrument-side display unit 111 by the inspection operator P, associating the measurement information image E1 stored in the storage unit 23 with the inspection pass/fail determination result R based on the operation received by the storage operation unit 1151, and performing the control for storing the inspection pass/fail determination result R in the storage unit 23. With this, the inspection pass/fail determination result R can be stored in association with the measurement information image E1 stored at a desired time.

In the fifth embodiment, as described above, the control unit 1128 is configured to store the tag information E6 in the storage unit 23 by associating the measurement information image E1 stored based on the operation on the storage operation unit 1151 with the tag information E6 (discrimination information) which makes the stored measurement information image E1 discriminable state. With this, the inspection operator P can associate the tag information E6 different from the inspection pass/fail determination result R with the measurement information image E1 stored at a desired time and store them. As a result, it is possible to easily associate the information other than the inspection pass/fail determination result with each measurement information image E1 and store them, and therefore, it is possible to easily refer to the information other than the inspection pass/fail determination result R among the plurality of stored measurement information images E1. Further, for example, in a case where the inspection operator P associates the predetermined information other than the inspection pass/fail determination result R according to a certain criterion (for example, in a case where tagging for discrimination is performed on the measurement information image E1 according to a predetermined criterion), the information corresponding to the predetermined criterion can be easily extracted from the plurality of stored measurement information images E1.

Further, in the fifth embodiment, as described above, it further includes the imaging unit 22 (second imaging unit) provided on the side of the inspection operator P for capturing the inspection target Q, the storage operation unit 1151 for simultaneously receiving the operation for storing the inspection target image E2 captured by the imaging unit 22 and the operation for storing the measurement information image E1, the storage unit for storing the measurement information image E1 and the inspection target image E2, the control unit 1128 for performing control for storing the measurement information image E1 and the inspection target image E2 in the storage unit 23 based on the operation received by the storage operation unit 1151. This makes it possible to store the inspection target image E2 in addition the measurement information image E1 at a desired time. As a result, the measurement information image E1 and the inspection target image E2 can be arbitrarily stored even in a case where the inspection pass/fail determination is not performed.

In the fifth embodiment, as described above, the control unit 1128 is configured to perform control for acquiring the inspection pass/fail determination result R related to the inspection target Q based on the measurement result of the measurement instrument-side display unit 111 by the inspection operator P, associating the measurement information image E1 and the inspection target image E2 stored in the storage unit 23 with the inspection pass/fail determination result R based on the operation received by the storage operation unit 1151, and storing the inspection pass/fail determination result R in the storage unit 23. With this, the inspection pass/fail determination result R can be stored in association with the measurement information image E1 and the inspection target image E2 stored at a desired timing.

In the fifth embodiment, as described above, the control unit 1128 is configured to perform control for associating the measurement information image E1 and the inspection target image E2 stored based on the operation to the storage operation unit 1151 with the tag information E6 (discrimination information) for making the stored measurement information image E1 and the inspection target image E2 distinguishable, and storing the tag information E6 in the storage unit 23. With this, the inspection operator P can associate the tag information E6 different from the tag information E6 of the inspection pass/fail determination result R with the measurement information image E1 and the inspection target image E2 and store them at a desired timing. As a result, the information other than the inspection pass/fail determination result R can be easily referred to from the plurality of stored measurement information images E1 and inspection target images E2 because the information other than the pass/fail determination result can be easily stored in association with the measurement information image E1 and the inspection target image E2. Further, for example, in a case where the inspection operator P associates the predetermined information other than the inspection pass/fail determination result R according to a certain criterion (for example, in a case where tagging for discrimination is performed on the measurement information image E1 and the inspection target image E2 according to a predetermined criterion), the information corresponding to the predetermined criterion can be easily extracted from the plurality of stored measurement information images E1 and inspection target images E2.

In the fifth embodiment, as described above, the operation for storing the measurement information image E1 is received by the storage operation unit 1151, and the measurement information image E1 is stored based on the operation received by the storage operation unit 1151. Thus, the measurement information image E1 can be stored at a desired time. As a result, the measurement information image E1 can be arbitrarily stored even in a case where the pass/fail determination is not performed.

The other effects of the fifth embodiment are similar to those of the first to fourth embodiments.

Sixth Embodiment

Next, referring to FIG. 25 to FIG. 27, a configuration of an aircraft inspection support device 1200 according to a sixth embodiment of the present invention will be described. In this sixth embodiment, unlike the fifth embodiment of the aircraft inspection support device 1100 in which the storage operation unit 1151 is held by the inspection operator P, the storage operation panel 1251 (storage operation unit) is attached to the measurement probe 112. Note that the same configuration as that of the above-described first to fifth embodiments are denoted by the same reference numeral in the figures, and the descriptions thereof will be omitted.

The aircraft inspection support device 1200 according to the sixth embodiment is provided with the operator-side unit 1202 as shown in FIG. 25. The operator-side unit 1202 includes the storage operation panel 1251. The storage operation panel 1251 includes a recording button 1251a. Note that the storage operation panel 1251 is an example of the "storage operation unit" recited in claims.

As shown in FIG. 26, the storage operation panel 1251 is configured to be held by the inspection operator P and attached to the measurement probe 112 connected to the measurement instrument 110 to detect the measurement information D1. Specifically, as shown in FIG. 27, the storage operation panel 1251 includes the attachment member 1251c for attaching the storage operation panel 1251 to the measurement probe 112. The attachment member 1251c is fixed to (mounted on) the measurement probe 112, fixed to the storage operation panel 1251, and configured as a member (joint) for fixing the measurement probe 112 and the storage operation panel 1251 to each other. The storage operation panel 1251 is configured such that the inspection operator P can press the recording button 1251a in a state in which the storage operation panel 1251 is fixed to (mounted on) the measurement probe 112. The rest of the configuration of the sixth embodiment is the same as that of the fifth embodiment.

[Effects of Sixth Embodiment]

In the sixth embodiment, the following effects can be obtained.

In the sixth embodiment, as described above, the storage operation panel 1251 (storage operation unit) is configured to be held by the inspection operator P and attached to the measurement probe 112 connected to the measurement instrument 110 to detect the measurement information D1. Thus, the task of operating the measurement probe 112 and the task of storing the measurement information image E1 can be easily performed with one hand. As a result, since the measurement information image E1 can be easily stored while performing the inspection, the increase in the labor required for the inspection operator P to store the measurement information image E1 can be suppressed. Note that the other effects of embodiment 6 are the same as those of the first to fifth embodiments.

Modified Embodiment

It should be understood that the embodiments disclosed here are examples in all respects and are not restrictive. The scope of the present invention is shown by the scope of claims rather than the descriptions of the embodiments described above, and includes all changes (modifications) within the meaning of equivalent and the scope of claims.

First Modification

Figure 14:
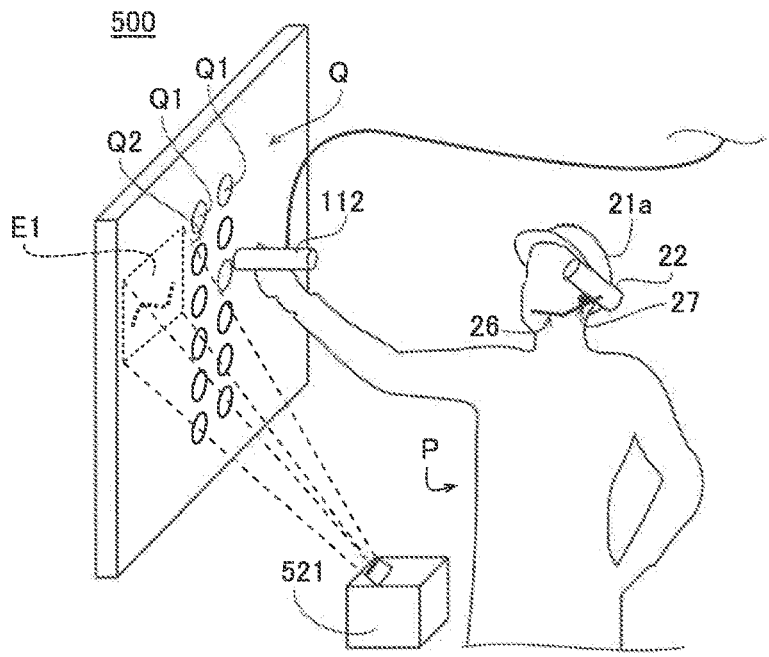
FIG. 14 is a schematic diagram showing a configuration of an aircraft inspection support device according to a first modification of the first to sixth embodiments.

For example, in the first to sixth embodiments, an example is shown in which the measurement information image E1 is displayed on the HMD or the display unit, but the present invention is not limited thereto. For example, like the projector 521 of the aircraft inspection support device 500 according to the first modification shown in FIG. 14, the measurement information image E1 may be displayed by irradiating the inspection target Q (the aircraft fuselage) with light.

Second Modified Example

Figure 15:
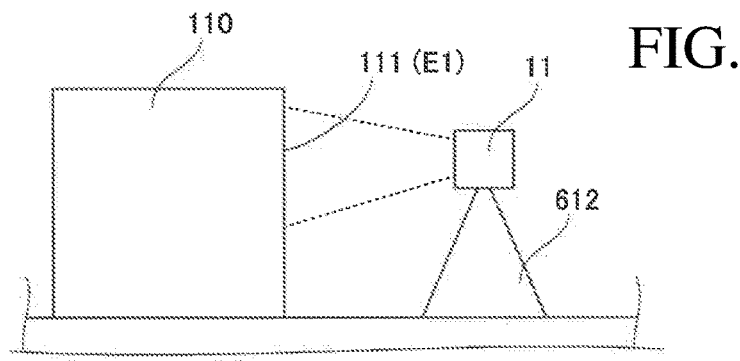
FIG. 15 is a schematic diagram showing a configuration of a fixing member according to a second modification of the first to sixth embodiments.

In the first to sixth embodiments, an example is shown in which the fixing member is configured as a joint for connecting the imaging unit and the measurement instrument, but the present invention is not limited thereto. For example, like the fixing member 612 according to the second modification shown in FIG. 15, it may be configured such that the imaging unit 11 is fixed to the floor (or the scaffold) at a position spaced apart from the measurement instrument 110 and the relative position of the measurement instrument 110 is fixed with respect to the floor (scaffold). Note that the fixing member 612 may be configured as a carriage for holding the imaging unit 11 by providing wheels to the fixing member 612.

Third and Fourth Modifications

Figure 16:
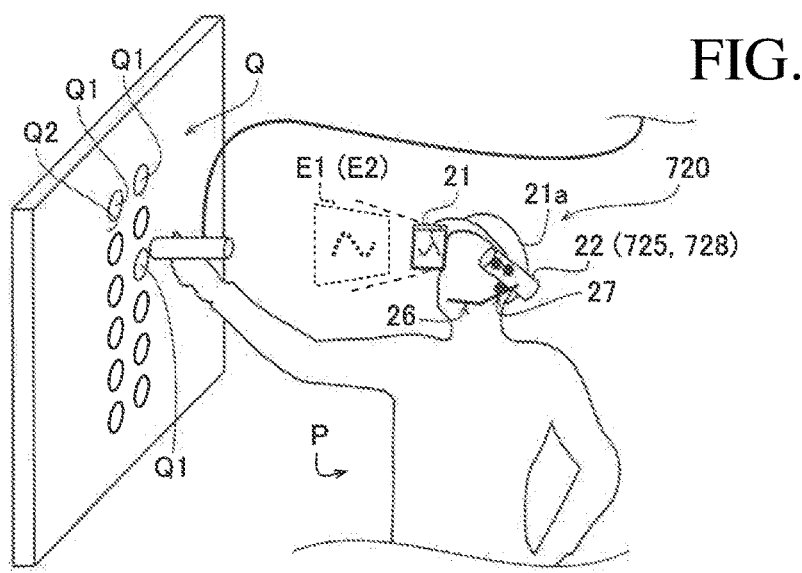
FIG. 16 is a schematic diagram showing a configuration of an HMD according to a third modification of the first to sixth embodiments.

In the first to sixth embodiments, an example is shown in which the operator-side display unit (the HMD or the mobile information terminal), the control unit, and the determination operation unit are configured by separate devices, but the present invention is not limited thereto. For example, like the HMD 720 according to the third modification shown in FIG. 16, the control unit 728 for performing Steps S1 to S5 and the determination operation unit 725 for receiving the input operation of the inspection pass/fail determination result R may be provided on the HMD 720. Further, like the mobile information terminal 740 according to the fourth modification shown in FIG. 17, the mobile information terminal 740 may be provided with the control unit 728a for performing Step S1 to S5 and the touch panel 741 for receiving the input operation of the inspection pass/fail determination result R. With this configuration, the number of components of the aircraft inspection support device can be reduced.

Fifth Modification

Further, in the first to sixth embodiments, an example is shown in which the imaging unit 11 is composed of one imaging unit, but the present invention is not limited thereto. For example, like the imaging unit 811 shown in FIG. 18, it may be configured such that a first imaging unit 811a, a second imaging unit 811b, a third imaging unit 811c, and a fourth imaging unit 811d are provided to image the different areas of the measurement instrument-side display unit 111 by the first imaging unit 811a to the fourth imaging unit 811d and perform image processing for reconstructing the measurement information image E1 by the imaging unit 811 (or control unit). Note that the imaging unit 811 is an example of the "first imaging unit" recited in claims.

Sixth Modification

Further, in the first to sixth embodiments, an example (see FIG. 3) is shown in which the measurement instrument mounting member is composed of the belt-like operator-side mounting portion to be put on both shoulders of the inspection operator and the measurement instrument holder as a support member for holding the measurement instrument 110 on the back of the inspection operator P, but the present invention is not limited thereto. For example, like the measurement instrument mounting member 914 of the sixth modification shown in FIG. 19, it may be configured as a movable carriage with the measurement instrument 110 placed thereon. In this case, the measurement instrument mounting member 914 (carriage) is moved together with the inspection operator P, and the inspection operator P can directly view the measurement instrument-side display unit 111 as appropriate.

(Other Modifications)

Further, in the first to sixth embodiments, an example is shown in which the aircraft inspection support device is provided with the storage unit and the communication unit, but the present invention is not limited thereto. For example, it may be configured such that the aircraft inspection support device is not provided with the storage unit and the acquired measurement information image E1 and the like are transmitted to the server device by the communication unit, or that the communication unit is not provided and the storage unit is detachably provided, and the storage unit is detached from the aircraft inspection support device and connected to the server device to transmit the measurement information image E1, etc., to the server device.

Further, in the second to sixth embodiments, an example is shown in which the storage unit is provided in the controller box in which the control unit is provided, but the present invention is not limited thereto. For example, the mobile information terminal may have the storage unit. Similarly, although an example is shown in which the communication unit is provided in the controller box in which the control unit is provided, the present invention is not limited thereto. For example, the mobile information terminal may be provided with the communication unit.

Further, in the first to sixth embodiments, an example is shown in which the measurement instrument-side display unit displays the measurement information on the fuselage (rivet and plate) of the aircraft as a component of an aircraft. However, the present invention is not limited thereto. For example, the present invention may be applied by serving the display unit for displaying the measurement result of a borescope or an observation result when inspecting equipment, such as, e.g., the turbine inside the engine as a component of an aircraft or observing the state of a bird strike, as a measurement instrument-side display unit. Further, the present invention may be applied to a test or an inspection using measurement instruments, etc.

In the first to sixth embodiments, an example is shown in which the aircraft inspection support device is provided with the communication unit to enable radio communication, but the present invention is not limited thereto. That is, the configuration for radio communication described in the above-described first to fourth embodiments may be configured as a configuration for wired communication using cables.

Further, in the first to fourth embodiments, an example is shown in which the control unit is configured so that all of the acquired measurement information image E1, the inspection target image E2, and the voice information E3 are stored in the storage unit, but the present invention is not limited thereto. That is, the control unit may be configured to store in the storage unit only for a predetermined period before and after the time point when the inspection pass/fail determination result R is acquired among the acquired measurement information image E1, inspection target image E2, and voice information E3.

Further, in the first to fourth embodiments, an example is shown in which the control unit of the operator-side unit performs Steps S1 to S5, but the present invention is not limited thereto. That is, Step S4 may be performed by the control unit 28 of the operator-side unit, or Step S5 may be performed by the control unit (control unit of the control room) of the server device, or Steps S1 to S5 may be performed in an information terminal separate from the operator-side unit, wherein the information terminal installs application programs for executing Steps S1 to S5.

Further, in the first to sixth embodiments 1 to 6, an example is shown in which the server device is provided in the control room, but the present invention is not limited thereto. That is, the server device may be provided at a location other than the control room. For example, the server device may be provided in the facility, etc., of an aircraft maintenance company.

Further, in the first to sixth embodiments, an example is shown in which the inspection pass/fail determination result is obtained based on the input operation by the determination operation unit, but the present invention is not limited thereto. For example, the control unit may be configured to perform the inspection pass/fail determination by the image-recognition determination or the like, and the inspection pass/fail determination result may be acquired based on the measurement information image.

Further, in the first to sixth embodiments, an example is shown in which the imaging unit is arranged at the (front) position facing the measurement instrument-side display unit, but the present invention is not limited thereto. For example, by combining the imaging unit with optical components (lens, mirrors, etc.), the measurement instrument-side display unit may be imaged in a state in which the imaging unit is arranged at a position other than the position facing the measurement instrument-side display unit. That is, it is sufficient to configure the imaging unit so that the measurement instrument-side display unit can be imaged according to the position (status) where the imaging unit can be arranged.

Further, in the first and second embodiments, an example is shown in which the determination operation unit is provided separately from the controller box in which the control unit is provided, but the present invention is not limited thereto. That is, the determination operation unit may be formed integrally with the controller box in which the control unit is provided.

Further, the first to sixth embodiments and the above-described modifications may be appropriately combined. For example, in the second to fourth embodiments, an example is shown in which the mobile information terminal is provided with the touch panel function and the determination operation unit and the operator-side display unit are integrated, but the present invention is not limited thereto. That is, like the separately configured operator-side display unit and determination operation unit of the first embodiment, the operator-side display unit may be provided on the mobile information terminal, and the determination operation unit may be provided separately from the mobile information terminal. Further, in the first embodiment, an example is shown in which the information E5 on the aircraft inspection is stored in advance in the server device or after the inspection, and in the second embodiment, an example is shown in which the information E5 on the aircraft inspection is input in the mobile information terminal, but in the first, third, and fourth embodiments, the information E5 on the aircraft inspection may be input to the aircraft support device, or in the second to fourth embodiments, the information E5 on the aircraft inspection may be stored in advance in the server device or stored after the inspection.

Further, in the fifth and sixth embodiments, an example is shown in which it is provided with the storage unit for storing the measurement information image, the storage operation unit (storage operation panel) for receiving the operation for storing the measurement information image, and the control unit for performing the control for storing the measurement information image in the storage unit based on the operation received by the storage operation unit are provided, but the present invention is not limited thereto. For example, the operation for storing the measurement information image may be received by the input to the mobile information terminal. Alternatively, the measurement information image may be stored, for example, at predetermined intervals without providing the storage operation unit for receiving the operation for storage. It may be configured to start the storage of the measurement information image at a timing when the measurement instrument generates a measuring sound wave or the like.

Further, in the fifth embodiment, an example is shown in which the storage operation unit is configured to be carried or held by the inspection operator, but the present invention is not limited thereto. For example, it may be arranged on a scaffold or the like near the point where the inspection operator works. It may also be integrally attached to the HMD.

Further, in the sixth embodiment, an example is shown in which the storage operation unit (storage operation panel) is provided on the measurement probe to be held by the inspection operator and connected to the measurement instrument to detect the measurement information, but the present invention is not limited thereto. For example, it may be attached to the touch panel in the aircraft inspection support device according to the second to fourth embodiments.

Further, in the fifth and sixth embodiments, an example is shown in which the storage operation unit (storage operation panel) is arranged apart from the control unit, and the control unit is configured to perform control for acquiring the signal for operations for storing the measurement information image received by the storage operation unit by the radio communication, but the present invention is not limited thereto. For example, the storage operation unit and the control unit may be connected by wire.

Further, in the fifth and sixth embodiments, an example is shown in which the control unit is configured to perform control for acquiring the inspection pass/fail determination result on the inspection target based on the measurement result of the measurement instrument-side display unit by the inspection operator, associating the measurement information image stored in the storage unit with the inspection pass/fail determination result based on the operation received by the storage operation unit (storage operation panel), and storing the inspection pass/fail determination result in the storage unit, but the present invention is not limited thereto. For example, it may be configured to perform control for automatically acquiring the inspection pass/fail determination result by image recognition, associate the measurement information image stored in the storage unit with the inspection pass/fail determination result, and storing the inspection pass/fail determination result in the storage unit. Further, the inspection pass/fail determination result may be acquired based on the sound of the inspection operator acquired by the voice acquisition unit.

Further, in the fifth and sixth embodiments, an example is shown in which the control unit is configured to associate the measurement information image stored based on the operation on the storage operation unit (storage operation panel) with the discrimination information that makes the stored measurement information image identifiable and store the discrimination information in the storage unit, but the present invention is not limited thereto. For example, the discrimination information may be stored based on an operation to the storage operation unit. The audio acquired by the voice acquisition unit may be stored as the discrimination information in association with the measurement information image.

Further, in the fifth and sixth embodiment, an example is shown in which it is further provided with the imaging unit 22 (second imaging unit) provided on the inspection operator side for capturing the inspection target, the storage operation unit (storage operation panel) for simultaneously receiving the operation for storing the inspection target image captured by the imaging unit 22 and the operation for storing the measurement information image, the storage unit for storing the measurement information image and the inspection target image, and the control unit for storing the measurement information image and the inspection target image in the storage unit based on the operation received by the storage operation unit, but the present invention is not limited thereto. For example, it may be configured to store only the measurement information image based on the operation received by the storage operation unit. Further, it may be configured to store only the inspection target image.

Further, in the fifth and sixth embodiment, an example is shown in which the control unit is configured to acquire the inspection pass/fail determination result related to the inspection target based on the measurement result of the measurement instrument-side display unit by the inspection operator, associate the measurement information image and the inspection target image stored in the storage unit with the inspection pass/fail determination result based on the operation received by the storage operation unit (storage operation panel), and perform the control for storing the inspection pass/fail determination result in the storage unit, but the present invention is not limited thereto. For example, it may be configured such that without storing the inspection target image, only the measurement information image and the inspection pass/fail determination result are stored in association with each other. Further, it may be configured such that without storing the measurement information image, only the inspection target image and the inspection pass/fail determination result are stored in association with each other.

Further, in the fifth and sixth embodiment, an example is shown in which the measurement information image and the inspection target image are stored simultaneously based on the operation to the storage operation unit (storage operation panel), but the present invention is not limited to this. For example, it may be configured such that the storage operation unit is provided with a plurality of recording buttons, and the operation of storing the measurement information image and the operation of storing the inspection target image are separately received. Further, it may be configured such that even in the case of performing the operation to one recording button, the operation for storing the measurement information image and the operation for storing the inspection target image may be separately received by a method of pressing the recording button (e.g., by pressing long or by pressing twice consecutively).

Further, in the fifth and sixth embodiments, an example is shown in which control unit is configured to associate the measurement information image and the inspection target image stored based on the operation to the storage operation unit (storage operation panel) with the discrimination information that makes the stored measurement information image and inspection target image distinguishable, and perform the control for storing the discrimination information in the storage unit, but the present invention is not limited thereto. For example, it may be configured such that the feature amount is acquired from at least one of the measurement information image and the inspection target image, and the discrimination information corresponding to the acquired feature amount is stored in association with the acquired feature amount based on the acquired feature amount.

Further, in the fifth and sixth embodiment, an example is shown in which both the inspection pass/fail determination result and the tag information are acquired and stored in association with the measurement information image and the inspection target image stored in the storage unit, but the present invention is not limited thereto. For example, it may be configured such that without acquiring the inspection pass/fail determination result, only the tag information is stored in association with at least one of measurement information image and the inspection target image stored in the storage unit.

Further, in the fifth and sixth embodiment, an example is shown in which the tag information includes the marker information for discriminating a star mark or the like, and the character information, such as, e.g., comments, but the present invention is not limited thereto. For example, only the marker information for discriminating a star mark or the like may be used. Alternatively, only the character information, such as, e.g., comments, may be used.

Further, in the fifth and sixth embodiment, an example is shown in which the inspection operator P performs the input operation for acquiring the inspection pass/fail determination result and the input operation for acquiring the tag information while visually recognizing the measurement information image and the inspection target image displayed on the touch panel, the present invention is not limited thereto. For example, it may be configured such that an operator different from the inspection operator performs the input operation for acquiring the inspection pass/fail determination result and the input operation for acquiring the tag information while viewing the measurement information image and the inspection target image displayed on the display device different from the mobile information terminal (touch panel).

Reference Example

The present invention can be applied to an inspection support device other than an aircraft inspection support device. That is, the inspection support device 1000 according to the example shown in FIG. 20 is provided with an imaging unit 1001 having a measurement instrument-side display unit for displaying measurement information on an inspection target different from components of an aircraft, and an operator-side display unit 1002 for visually displaying a measurement information image for the inspection operator who is performing the inspection near the inspection target.

DESCRIPTION OF SYMBOLS

11, 811: Imaging unit (first imaging unit)
14: Measurement instrument mounting member
21, 720: HMD (operator-side display unit)
21a: HMD mounting member (second imaging unit mounting member)
22: Imaging unit (second imaging unit)
23: Storage unit
24, 1124: Communication unit (transmission unit)
25: Operation unit (determination operation unit)
26, 243: Voice acquisition unit
28, 228, 728, 728a, 1128: Control unit
100, 200, 300, 400, 500, 1100, 1200: Aircraft inspection support device
110: Measurement instrument
111: Measurement instrument-side display unit
112: Measurement probe
121: Server device
240, 340, 440, 740, 1140: Mobile information terminal (operator-side display unit, arm portion mounting-side display unit)
241, 741: Touch panel
441: Holding unit
521: Projector (operator-side display unit)
1151, 1251: Storage operation panel (storage operation unit)

The invention claimed is:
1. An aircraft inspection support device comprising:
a first imaging unit configured to capture a measurement information image displayed on a measurement instrument-side display unit of a specific measurement instrument associated with a model of an aircraft or an inspection target of an aircraft component, the measurement instrument-side display unit being configured to display measurement information on the inspection target; and an operator-side display unit configured to display the measurement information image so as to be visible to an inspection operator during performing an inspection operation near the inspection target.

2. The aircraft inspection support device as recited in claim 1,
wherein the operator-side display unit is configured to be carried by or mounted on the inspection operator.

3. The aircraft inspection support device as recited in claim 1, further comprising:
a storage unit configured to store the measurement information image; and
a control unit configured to perform control for acquiring an inspection pass/fail determination result related to the inspection target based on a measurement result of the measurement instrument-side display unit by the inspection operator, associating the measurement information image and the inspection pass/fail determination result, and storing the measurement information image and the inspection pass/fail determination result in the storage unit.

4. The aircraft inspection support device as recited in claim 3,
wherein the control unit is configured to perform control for associating the measurement information image and the inspection pass/fail determination result at a time of acquiring the inspection pass/fail determination result and storing the measurement information image and the inspection pass/fail determination result in the storage unit.

5. The aircraft inspection support device as recited in claim 4, further comprising:
a determination operation unit configured to receive an input operation by the inspection operator as the inspection pass/fail determination result,
wherein the control unit is configured to perform control for associating the measurement information image and the inspection pass/fail determination result at a time of receiving the input operation to the determination operation unit and storing the measurement information image and the inspection pass/fail determination result in the storage unit.

6. The aircraft inspection support device as recited in claim 5,
wherein the determination operation unit is configured to receive, in addition to the inspection pass/fail determination result, the input operation by the inspection operator as information on an aircraft inspection, and
wherein the control unit is configured to perform control for storing the information on the aircraft inspection acquired from the determination operation unit in the storage unit.

7. The aircraft inspection support device as recited in claim 3, further comprising:
a second imaging unit configured to image the inspection target, the second imaging unit being provided on a side of the inspection operator,
wherein the control unit is configured to perform control for associating an inspection target image that is an image captured by the second imaging unit, the measurement information image, and the inspection pass/fail determination result and storing the inspection target image, the measurement information image, and the inspection pass/fail determination result in the storage unit.

8. The aircraft inspection support device as recited in claim 7, further comprising:
a second imaging unit mounting member configured to mount the second imaging unit on a head of the inspection operator.

9. The aircraft inspection support device as recited in claim 3, further comprising:
a voice acquisition unit configured to capture audio,
wherein the control unit is configured to perform control for associating associate voice information acquired by the voice acquisition unit, the measurement information image, and the inspection pass/fail determination result and storing the voice information, the measurement information image, and the inspection pass/fail determination result in the storage unit.

10. The aircraft inspection support device as recited in claim 3,
wherein the control unit is configured to perform control for storing the image captured by the measurement instrument-side display unit for displaying the measurement information composed of an analog signal in the storage unit as the measurement information image composed of a digital signal.

11. The aircraft inspection support device as recited in claim 3, further comprising:
a communication unit configured to transmit/receive at least one of information in which the measurement information image and the inspection pass/fail determination result are associated and information on an aircraft inspection to/from the server device.

12. The aircraft inspection support device as recited in claim 1,
wherein the operator-side display unit is configured as a head-mounted display for displaying an image of the inspection target and the measurement information image, the head-mounted display being configured to be mounted on a head of the inspection operator.

13. The aircraft inspection support device as recited in claim 12, further comprising:
a storage unit configured to store the measurement information image;
a control unit configured to perform control for acquiring the inspection pass/fail determination result related to the inspection target, associating the measurement information image and the inspection pass/fail determination result, and storing the measurement information image and the inspection pass/fail determination result in the storage unit; and
a touch panel configured to receive the inspection pass/fail determination result as an input operation by the inspection operator and serve as the operator-side display unit.

14. The aircraft inspection support device as recited in claim 1,
wherein the operator-side display unit is configured as an arm-mounted display unit for displaying the measurement information image, the operator-side display unit being configured to be mounted on an arm of the inspection operator.

15. The aircraft inspection support device as recited in claim 1,
wherein the operator-side display unit is attached to a measurement probe, the measurement probe being configured to be held by the inspection operator and connected to the measurement instrument to detect the measurement information.

16. The aircraft inspection support device as recited in claim 1,
wherein the operator-side display unit includes a holding unit for holding an arrangement position with respect to the inspection target.

17. The aircraft inspection support device as recited in claim 1, further comprising:
a measurement instrument mounting member configured to mount the measurement instrument on the inspection operator.

18. The aircraft inspection support device as recited in claim 1, further comprising:
a storage unit configured to store the measurement information image;
a storage operation unit configured to receive an operation for storing the measurement information image; and
a control unit configured to perform control for storing the measurement information image in the storage unit based on an operation received by the storage operation unit.

19. The aircraft inspection support device as recited in claim 18,
wherein the storage operation unit is configured to be carried or held by the inspection operator.

20. The aircraft inspection support device as recited in claim 18,
wherein the storage operation unit is attached to a measurement probe, the measurement probe being configured to be held by the inspection operator and connected to the measurement instrument to detect the measurement information.

21. The aircraft inspection support device as recited in claim 18,
wherein the storage operation unit is arranged so as to be spaced apart from the control unit, and
wherein the control unit is configured to perform control for acquiring a signal for an operation for storing the measurement information image received by the storage operation unit by radio communication.

22. The aircraft inspection support device as recited in claim 18,
wherein the control unit is configured to perform control for acquiring the inspection pass/fail determination result related the inspection target based on the measurement result of the measurement instrument-side display unit by the inspection operator, associating the measurement information image stored in the storage unit and the inspection pass/fail determination result based on the operation received by the storage operation unit, and storing the inspection pass/fail determination result in the storage unit.

23. The aircraft inspection support device as recited in claim 18,
wherein the control unit is configured to associate the measurement information image stored based on an operation to the storage operation unit and discrimination information that makes the stored measurement information image identifiable and store the discrimination information in the storage unit.

24. The aircraft inspection support device as recited in claim 18, further comprising:
a second imaging unit configured to image the inspection target, the second imaging unit being configured to be provided on a side of the inspection operator;
a storage operation unit configured to simultaneously or individually receive an operation for storing the inspection target image captured by the second imaging unit and an operation for storing the measurement information image;
a storage unit configured to store at least one of the measurement information image and the inspection target image; and
a control unit configured to perform control for storing at least one of the measurement information image and the inspection target image in the storage unit based on an operation received by the storage operation unit.

25. The aircraft inspection support device as recited in claim 24,
wherein the control unit is configured to perform control for acquiring the inspection pass/fail determination result related to the inspection target based on the measurement result of the measurement instrument-side display unit by the inspection operator, associating at least one of the measurement information image and the inspection target image stored in the storage based on the operation received by the storage operation unit with the inspection pass/fail determination result, and storing the the inspection pass/fail determination result in the storage unit.

26. The aircraft inspection support device as recited in claim 25,
wherein the control unit is configured to perform control for associating at least one of the measurement information image and the inspection target image stored based on the operation to the storage operation unit with discrimination information that makes at least one of the measurement information image and the inspection target image stored identifiable and storing the discrimination information in the storage unit.

27. An aircraft inspection support method comprising:
capturing a measurement information image displayed on a measurement instrument-side display unit of a specific measurement instrument associated with a model of an aircraft or an inspection target of an aircraft component, the measurement instrument-side display unit being configured to display measurement information on the inspection target; and
displaying the measurement information image by an operation-side display unit so as to be visible to an inspection operator who is performing an inspection operation near the inspection target.

28. The aircraft inspection support method as recited in claim 27, further comprising:
acquiring an inspection pass/fail determination result related to the inspection target based on a measurement result of the measurement instrument-side display unit by the inspection operator;
associating the measurement information image and the inspection pass/fail determination result; and
storing the measurement information image and the inspection pass/fail determination result associated with each other.

29. The aircraft inspection support method as recited in claim 28, further comprising:
transmitting information on the measurement information image and the inspection pass/fail determination result associated with each other from the aircraft inspection support device to the server device; and
associating the information on an aircraft inspection which has been previously stored in the server device or which are to be stored in the server device after the inspection and the measurement information image and the inspection pass/fail determination result information associated with each other.

30. The aircraft inspection support method as recited in claim 27, further comprising:
 receiving an operation for storing the measurement information image by a storage operation unit; and
 storing the measurement information image based on an operation received by the storage operation unit.

\* \* \* \* \*